(12) United States Patent
Ramayya

(10) Patent No.: US 9,810,468 B2
(45) Date of Patent: *Nov. 7, 2017

(54) COMPRESSOR CRANKCASE HEATING CONTROL SYSTEMS AND METHODS

(71) Applicant: Emerson Climate Technologies, Inc., Sidney, OH (US)

(72) Inventor: George J. Ramayya, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,227

(22) Filed: May 27, 2016

(65) Prior Publication Data

US 2016/0273818 A1 Sep. 22, 2016

Related U.S. Application Data

(63) Continuation of application No. 14/461,796, filed on Aug. 18, 2014, now Pat. No. 9,353,738.
(Continued)

(51) Int. Cl.
*F04B 49/10* (2006.01)
*F25B 49/02* (2006.01)
(Continued)

(52) U.S. Cl.
CPC ............ *F25B 49/025* (2013.01); *F04B 35/04* (2013.01); *F04B 39/02* (2013.01);
(Continued)

(58) Field of Classification Search
CPC ...... F25B 49/025; F25B 31/026; F25B 13/00; F25B 31/023; F25B 31/002;
(Continued)

(56) References Cited

U.S. PATENT DOCUMENTS 2,107,887 A 2/1938 Davenport
3,133,429 A 5/1964 Griffin
(Continued)

FOREIGN PATENT DOCUMENTS

CN 1391060 A 1/2003
CN 101116232 A 1/2008
(Continued)

OTHER PUBLICATIONS

Office Action regarding U.S. Appl. No. 14/936,117, dated May 3, 2017.
(Continued)

*Primary Examiner* — Charles Freay
(74) *Attorney, Agent, or Firm* — Harness, Dickey & Pierce, P.L.C.

(57) ABSTRACT

A compressor crankcase heating control method for a heat pump system includes selectively actuating a first switching device to connect and disconnect first and second power lines to and from second and third switching devices, respectively, the first and second power lines receive a first voltage. The compressor crankcase heating control method further includes, when the first and second power lines are disconnected from the second and third switching devices via the first switching device, actuating the second and third switching devices thereby connecting third and fourth power lines to ends, respectively, of at least one winding of a stator of an electric motor of a compressor. The at least one winding of the stator of the electric motor heats the crankcase of the compressor. The third and fourth power lines receive a second voltage that is less than the first voltage.

20 Claims, 16 Drawing Sheets

Related U.S. Application Data

(60) Provisional application No. 61/879,875, filed on Sep. 19, 2013.

(51) Int. Cl.
| | |
|---|---|
| *F04B 39/02* | (2006.01) |
| *F25B 31/00* | (2006.01) |
| *F04B 39/06* | (2006.01) |
| *F04B 49/06* | (2006.01) |
| *F04B 35/04* | (2006.01) |
| *F04B 39/12* | (2006.01) |
| *F04C 18/02* | (2006.01) |
| *F04C 29/00* | (2006.01) |
| *F04C 29/04* | (2006.01) |
| *F25B 13/00* | (2006.01) |
| *F25B 31/02* | (2006.01) |

(52) U.S. Cl.
CPC .......... *F04B 39/0207* (2013.01); *F04B 39/06* (2013.01); *F04B 39/128* (2013.01); *F04B 49/06* (2013.01); *F04C 18/0215* (2013.01); *F04C 29/005* (2013.01); *F04C 29/0085* (2013.01); *F04C 29/04* (2013.01); *F25B 13/00* (2013.01); *F25B 31/002* (2013.01); *F25B 31/023* (2013.01); *F25B 31/026* (2013.01); *F04C 2240/30* (2013.01); *F25B 2400/01* (2013.01); *F25B 2600/02* (2013.01); *F25B 2600/021* (2013.01); *F25B 2600/111* (2013.01); *F25B 2700/2106* (2013.01); *F25B 2700/21152* (2013.01); *Y02B 30/741* (2013.01); *Y02B 30/743* (2013.01)

(58) Field of Classification Search
CPC ............ F25B 2600/02; F25B 2600/021; F25B 2600/111; F25B 2700/2106; F25B 2700/21152; F25B 2400/01; F04C 18/0215; F04C 29/005; F04C 29/04; F04C 29/0085; F04C 2240/30; F04B 39/128; F04B 35/04; F04B 39/02; F04B 39/06; F04B 49/06; F04B 39/0207; Y02B 30/741; Y02B 30/743
See application file for complete search history.

(56) References Cited

U.S. PATENT DOCUMENTS

| | | | |
|---|---|---|---|
| 3,208,237 A | | 9/1965 | Gerteis |
| 3,237,848 A | * | 3/1966 | Pihl .................. F25B 31/02 318/473 |
| 3,577,741 A | | 5/1971 | Shaw |
| 3,705,499 A | | 12/1972 | Mount et al. |
| 4,066,869 A | | 1/1978 | Apaloo et al. |
| 4,208,883 A | | 6/1980 | Stirling |
| 4,236,379 A | | 12/1980 | Mueller |
| 4,275,570 A | | 6/1981 | Szymaszek et al. |
| 4,444,017 A | | 4/1984 | Briccetti et al. |
| 4,490,988 A | | 1/1985 | Vogel et al. |
| 4,506,519 A | | 3/1985 | Morse et al. |
| 4,605,831 A | | 8/1986 | Mitchell |
| 4,638,643 A | | 1/1987 | Sakazume et al. |
| 5,012,652 A | | 5/1991 | Dudley |
| 5,052,897 A | | 10/1991 | Yamashita et al. |
| 5,054,293 A | | 10/1991 | Schwecke |
| 5,062,217 A | | 11/1991 | Tolson |
| 5,230,222 A | | 7/1993 | Erbs |
| 5,252,036 A | | 10/1993 | Bunch et al. |
| 5,369,958 A | | 12/1994 | Kasai et al. |
| 5,577,390 A | | 11/1996 | Kaido et al. |
| 6,523,361 B2 | | 2/2003 | Higashiyama |
| 6,591,621 B2 | | 7/2003 | Loprete et al. |
| 6,617,819 B2 | | 9/2003 | Dohmae et al. |
| 6,642,682 B1 | | 11/2003 | Perkins et al. |
| 6,834,513 B2 | | 12/2004 | O'Brien et al. |
| 6,848,268 B1 | | 2/2005 | Memory et al. |
| 6,886,354 B2 | | 5/2005 | Dudley |
| 6,904,759 B2 | | 6/2005 | Shoulders |
| 7,096,681 B2 | | 8/2006 | Wills et al. |
| 7,290,990 B2 | | 11/2007 | Lifson |
| 7,331,187 B2 | | 2/2008 | Kates |
| 7,797,084 B2 | | 9/2010 | Miwa |
| 8,616,855 B2 | | 12/2013 | Burchill et al. |
| 8,734,125 B2 | | 5/2014 | McSweeney et al. |
| 9,181,939 B2 | | 11/2015 | Pham |
| 9,353,738 B2 | * | 5/2016 | Ramayya ................ F04B 39/02 |
| 9,551,357 B2 | | 1/2017 | Waller |
| 2002/0018724 A1 | | 2/2002 | Millet et al. |
| 2002/0020175 A1 | | 2/2002 | Street et al. |
| 2002/0129612 A1 | | 9/2002 | Saikusa et al. |
| 2002/0157408 A1 | | 10/2002 | Egawa et al. |
| 2003/0213256 A1 | | 11/2003 | Ueda et al. |
| 2004/0068387 A1 | | 4/2004 | Bonanni et al. |
| 2004/0083731 A1 | | 5/2004 | Lasker |
| 2004/0194485 A1 | | 10/2004 | Dudley |
| 2004/0211193 A1 | | 10/2004 | Van der Walt et al. |
| 2005/0126171 A1 | | 6/2005 | Lasker |
| 2005/0188708 A1 | | 9/2005 | Wills et al. |
| 2005/0248456 A1 | | 11/2005 | Britton et al. |
| 2006/0070398 A1 | | 4/2006 | De Bernardi et al. |
| 2006/0196206 A1 | | 9/2006 | Murray et al. |
| 2007/0006608 A1 | | 1/2007 | Lee |
| 2008/0245083 A1 | | 10/2008 | Tutunoglu et al. |
| 2009/0324427 A1 | | 12/2009 | Tolbert, Jr. et al. |
| 2010/0254832 A1 | | 10/2010 | Nakazawa |
| 2010/0254834 A1 | | 10/2010 | Tolbert, Jr. |
| 2010/0278660 A1 | | 11/2010 | Burchill et al. |
| 2011/0070100 A1 | | 3/2011 | McSweeney et al. |
| 2011/0083450 A1 | | 4/2011 | Turner et al. |
| 2012/0227430 A1 | | 9/2012 | Takeuchi et al. |
| 2013/0045113 A1 | | 2/2013 | Foye et al. |
| 2013/0115063 A1 | | 5/2013 | Waller |
| 2014/0138451 A1 | | 5/2014 | Pham |
| 2014/0255209 A1 | | 9/2014 | McSweeney et al. |
| 2015/0075205 A1 | | 3/2015 | Ramayya |
| 2016/0061505 A1 | | 3/2016 | Pham |

FOREIGN PATENT DOCUMENTS

| | | |
|---|---|---|
| CN | 101319818 A | 12/2008 |
| CN | 101392745 A | 3/2009 |
| CN | 201425383 Y | 3/2010 |
| CN | 102466379 A | 5/2012 |
| CN | 102679507 A | 9/2012 |
| CN | 102725600 A | 10/2012 |
| CN | 103154638 A | 6/2013 |
| EP | 0546982 A1 | 6/1993 |
| JP | 6116278 | 1/1986 |
| JP | 61016278 | 1/1986 |
| JP | 10009685 | 1/1998 |
| JP | 2000002188 A | 1/2000 |
| WO | WO-2009095989 A1 | 8/2009 |
| WO | WO-2009096620 A1 | 8/2009 |
| WO | WO-2009096923 A1 | 8/2009 |
| WO | WO-2012125891 A2 | 9/2012 |

OTHER PUBLICATIONS

Search Report regarding European Patent Application No. 10819499.4, dated Apr. 13, 2017.

Search Report regarding European Patent Application No. 14846356.5, dated Apr. 10, 2017.

Office Action regarding U.S. Appl. No. 14/286,132, dated Jan. 30, 2017.

Office Action regarding Chinese Patent Application No. 201480051956.2, dated Nov. 28, 2016. Translation provided by Unitalen Attorneys at Law.

First Office Action and Search Report from State Intellectual Property Office of People's Republic of China regarding Chinese

(56) References Cited

OTHER PUBLICATIONS

Patent Application No. 201080042651.7, dated Jan. 15, 2014. Translation provided by Unitalen at Law.
Examiner-Initiated Interview Summary regarding U.S. Appl. No. 14/079,271, dated Sep. 16, 2015.
Extended European Search Report regarding Application No. 12187632.0-1602 / 2589898, dated Dec. 13, 2013.
Final Office Action for U.S. Appl. No. 13/664,805 dated Jun. 13, 2016.
First Chinese Office Action regarding Application No. 201210436480.7, dated Dec. 26, 2014. Translation obtained from espacenet.com.
International Search Report regarding Application No. PCT/US2010/050109, dated May 3, 2011.
International Search Report regarding Application No. PCT/US2013/070082, dated Feb. 20, 2014.
International Search Report regarding Application No. PCT/US2014/056120, dated Dec. 17, 2014.
Non-Final Office Action regarding U.S. Appl. No. 12/888,823, dated Jun. 11, 2013.
Non-Final Office Action regarding U.S. Appl. No. 13/664,805, dated May 8, 2015.
Notice of Allowance and Fees Due regarding U.S. Appl. No. 14/461,796, dated Apr. 1, 2016.
Office Action regarding Chinese Patent Application No. 201380060117.2, dated May 25, 2016. Translation provided by Unitalen Attorneys at Law.
Office Action regarding Chinese Patent Application No. 201410545027.9, dated Jan. 28, 2016. Translation provided by Unitalen Attorneys at Law.
Office Action regarding U.S. Appl. No. 13/664,805, dated Feb. 19, 2016.
Search Report regarding European Patent Application No. 13854340.0, dated Jun. 17, 2016.
Written Opinion of International Searching Authority regarding Application No. PCT/US2013/070082, dated Feb. 20, 2014.
Written Opinion of the International Searching Authority for PCT/US2013/070082, dated Feb. 20, 2014.
Written Opinion of the International Searching Authority regarding Application No. PCT/US2010/050109, dated May 3, 2011.
Written Opinion of the International Searching Authority regarding Application No. PCT/US2014/056120, dated Dec. 17, 2014.
Applicant-Initiated Interview Summary regarding U.S. Appl. No. 14/936,117, dated Jul. 11, 2017.
Office Action regarding U.S. Appl. No. 14/286,132, dated Jun. 29, 2017.

\* cited by examiner

_US 9,810,468 B2_

COMPRESSOR CRANKCASE HEATING CONTROL SYSTEMS AND METHODS

CROSS-REFERENCE TO RELATED APPLICATIONS

This application is a continuation of U.S. patent application Ser. No. 14/461,796 (now U.S. Pat. No. 9,353,738), filed on Aug. 18, 2014, which claims the benefit of U.S. Provisional Application No. 61/879,875, filed on Sep. 19, 2013. The entire disclosures of the applications referenced above are incorporated herein by reference.

FIELD

The present disclosure relates to compressors and more particularly to compressor crankcase heater control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Compressors may be used in a wide variety of industrial and residential applications to circulate refrigerant within a refrigeration, heat pump, HVAC, or chiller system (generically "heat pump systems") to provide a desired heating or cooling effect. In any of the foregoing applications, the compressor should provide consistent and efficient operation to ensure that the particular heat pump system functions properly.

Compressors may include crankcases to house moving parts of the compressor, such as a crankshaft. Crankcases may further include lubricant sumps, such as an oil reservoir. Lubricant sumps include lubricants that lubricate the moving parts of compressors. Lubrication of the moving parts may improve performance and/or prevent damage.

Lubricants in the crankcases may cool to low temperatures when the compressor is not running. For example, the crankcases may cool due to a low outdoor ambient temperature. Additionally, lubricants may cool and/or be diluted when liquid refrigerant returns to the compressor during the running cycle. Lubricant cooling may also occur under other circumstances.

Lubricant properties may change at low temperatures. More specifically, lubricants may become more viscous (i.e., thicker) at low temperatures. Starting a compressor with a low crankcase temperature and/or a significant amount of liquid within the shell may cause bearing wear and/or decreased performance due to insufficient lubrication.

SUMMARY

In a feature, a compressor crankcase heating control method for a heat pump system is disclosed. The compressor crankcase heating control method includes: selectively actuating a first switching device to connect and disconnect first and second power lines to and from second and third switching devices, respectively, the first and second power lines to receive a first voltage; when the first and second power lines are disconnected from the second and third switching devices via the first switching device, actuating the second and third switching devices thereby connecting third and fourth power lines to ends, respectively, of at least one winding of a stator of an electric motor of a compressor, the at least one winding of the stator of the electric motor heating the crankcase of the compressor, and the third and fourth power lines to receive a second voltage that is less than the first voltage.

In a feature, a method for a heat pump system is disclosed. The method includes: selectively actuating a first switching device to connect and disconnect first and second inputs of the first switching device to and from first and second nodes, respectively, the first input of the first switching device connected to a first power line, the second input of the first switching device connected to a second power line, the first and second power lines to receive a first voltage; when the first and second inputs are disconnected from the first and second nodes, respectively: (i) actuating a second switching device to connect a third input of the second switching device to a first output of the second switching device, the third input connected to a third power line, and the first output of the second switching device connected to at least one of a first end of a first winding of a stator of an electric motor of a compressor and a first end of a second winding of the stator; and (ii) actuating a third switching device to connect a fourth input of the third switching device to a second output of the third switching device, the fourth input connected to a third power line, the third power line for receiving a second voltage that is less than the first voltage, and the second output of the third switching device connected to second ends of the first and second windings. The method also includes, when the first and second inputs are connected to the first and second nodes, respectively: (i) actuating the second switching device to connect a fifth input of the second switching device to the first output of the second switching device, the fifth input connected to the first node; and (ii) actuating the third switching device to connect a sixth input of the third switching device to the second output of the third switching device, the sixth input connected to the second node.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
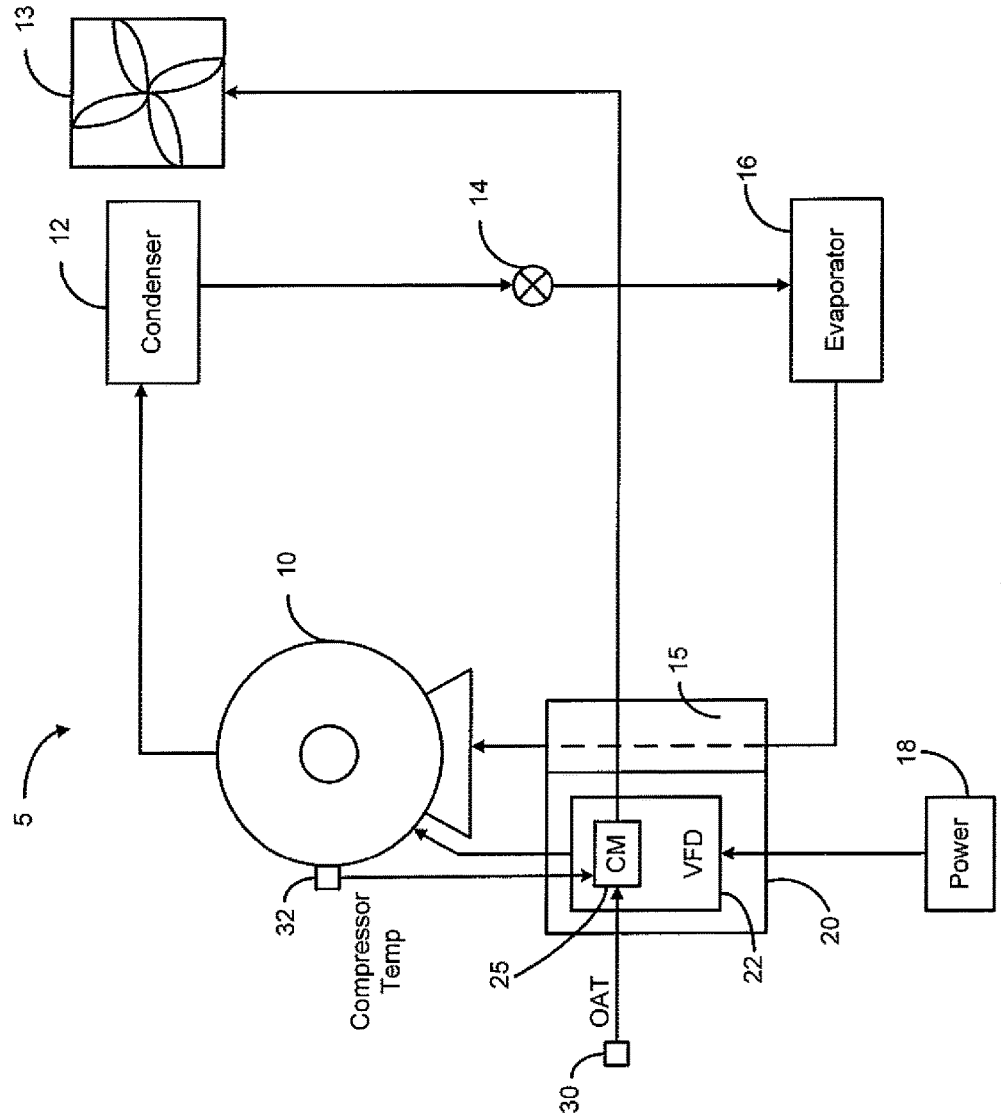
FIG. 1A is a functional block diagram of a first example heat pump system according to the present disclosure.

Compressors may include heating elements that heat crankcases in order to avoid problems related to "cold starting" or "liquid flood-back." Cold starting may refer to startup of a compressor when lubricants within the compressor are cold and diluted by refrigerant. The lubricants therefore are less viscous and have lower lubricating capabilities during cold starting, which may cause higher stress on one or more compressor components, such as a bearing.

Heating the crankcase of a compressor increases a temperature of lubricants inside the crankcase. Increasing the temperature of the lubricants may improve performance and/or prevent damage to the compressor due to the increased viscosity of cold lubricants.

Liquid flood-back may refer to when liquid (refrigerant) migrates into the compressor shell. Liquid migrates back to a compressor when the compressor is off and the compressor temperature is less than (its surrounding) ambient temperature. Heating the crankcase of the compressor may minimize liquid migration to the compressor and may remove liquid that has migrated to the compressor.

Typical crankcase heating elements, hereinafter referred to as "crankcase heaters," may operate in different ways. For example, belly band heaters and positive temperature coefficient (PTC) heaters are two types of devices that may be used as crankcase heating elements. The present application involves use of a stator of an electric motor of a compressor to perform crankcase heating.

The stator is a non-moving part of the electric motor in the compressor. When the compressor is on, the stator may magnetically drive a rotor that in turn drives a crankshaft. The crankshaft may, in turn, drive a compression mechanism of the compressor. When the compressor is in the off state, the stator may generate heat when supplied with current, and thus the stator may act as a heater for the lubricants inside the compressor and evaporate liquid refrigerant.

Crankcase heating may be performed continuously while the compressor is in an off state (i.e., not compressing). Continuous crankcase heating while the compressor is in the off state may heat the lubricant more than is required to avoid cold starting. However, this continuous use of crankcase heating is less efficient than desired due to wasted energy from excessive heating.

Systems and methods for more efficient crankcase heating are disclosed. Crankcase heating may be turned on or off based on an outdoor ambient temperature, a compressor temperature, both the outdoor ambient temperature and the compressor temperature, and/or a current date and time. For example, crankcase heating may be turned off for a predetermined period (e.g., approximately 3 hours) after the compressor is transitioned to the off state. The predetermined period may be set shorter than a period necessary for a predetermined amount of liquid migration back to the compressor shell to occur after the compressor is transitioned to the off state. Additionally or alternatively, crankcase heating may be turned off when the outdoor ambient temperature is greater than a predetermined temperature (e.g., approximately 75 degrees Fahrenheit). Additionally or alternatively, crankcase heating may be turned off when the compressor temperature minus the outdoor ambient temperature is greater than a first predetermined temperature (e.g., approximately 20 degrees Fahrenheit), and crankcase heating may be turned on when the compressor temperature minus the outdoor ambient temperature is less than a second predetermined temperature (e.g., 0 degrees Fahrenheit). The first predetermined temperature may be set based on a temperature indicative of little liquid remaining in the compressor shell. Additionally or alternatively, crankcase heating may be turned off when the compressor has been in the off state for a predetermined period (e.g., approximately 3 weeks) and the outdoor ambient temperature and the compressor temperature are less than a predetermined temperature (e.g., approximately 55 degrees Fahrenheit). The predetermined period and the predetermined temperature may be set such to be indicative of air conditioning being turned off for a season. Additionally or alternatively, crankcase heating may be turned off within a predetermined range of dates (e.g., approximately November 1 to approximately April 1 in the northern hemisphere). Additionally or alternatively, crankcase heating may be turned off for a predetermined period (e.g., approximately 12 am to approximately 10 am daily during diurnal cycle). Additionally or alternatively, crankcase heating may be turned off for the next predetermined duration (e.g., the next X number of days, weeks, or months). Disabling crankcase heating at times when crankcase heating would otherwise be performed decreases energy consumption and increases efficiency.

The stator receives a first voltage via power lines to drive the rotor, the crankshaft, and the compression mechanism of the compressor. The first voltage could also be used to perform crankcase heating. However, the first voltage is relatively higher than a voltage needed to perform crankcase heating to sufficiently prevent liquid floodback and cold starting. The present application therefore discloses systems and methods for generating and applying a second voltage that is less than the first AC voltage for crankcase heating, thereby increasing the efficiency of crankcase heating.

Figure 1B:
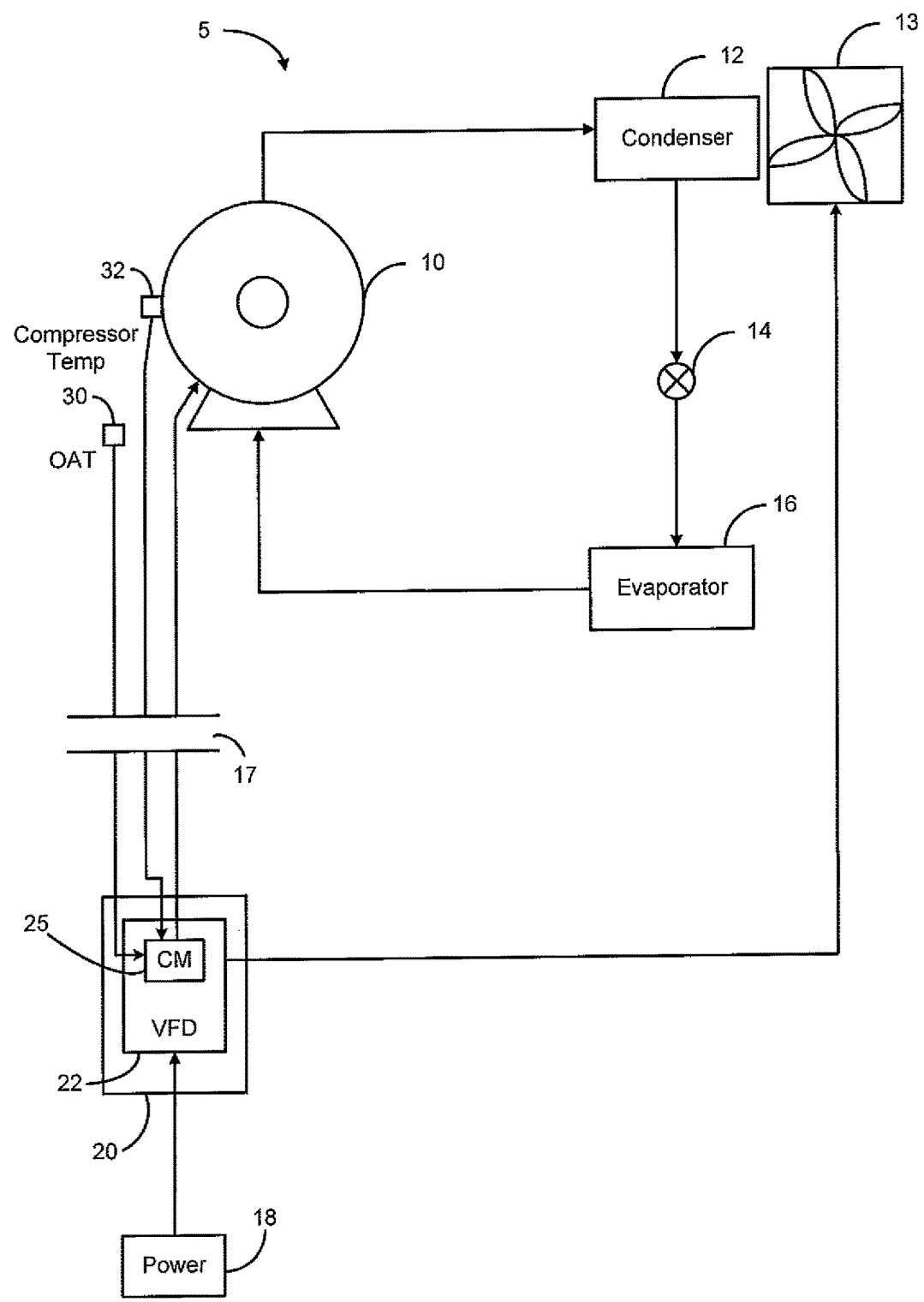
FIG. 1B is a functional block diagram of a second example heat pump system according to the present disclosure.

With reference to FIGS. 1A and 1B, functional block diagrams of example heat pump systems 5 are presented. The heat pump systems 5 include a compressor 10 that includes a shell that houses a compression mechanism. In an on state, the compression mechanism is driven by an electric motor to compress refrigerant vapor. In an off state, the compression mechanism does not compress refrigerant vapor.

Figure 4:
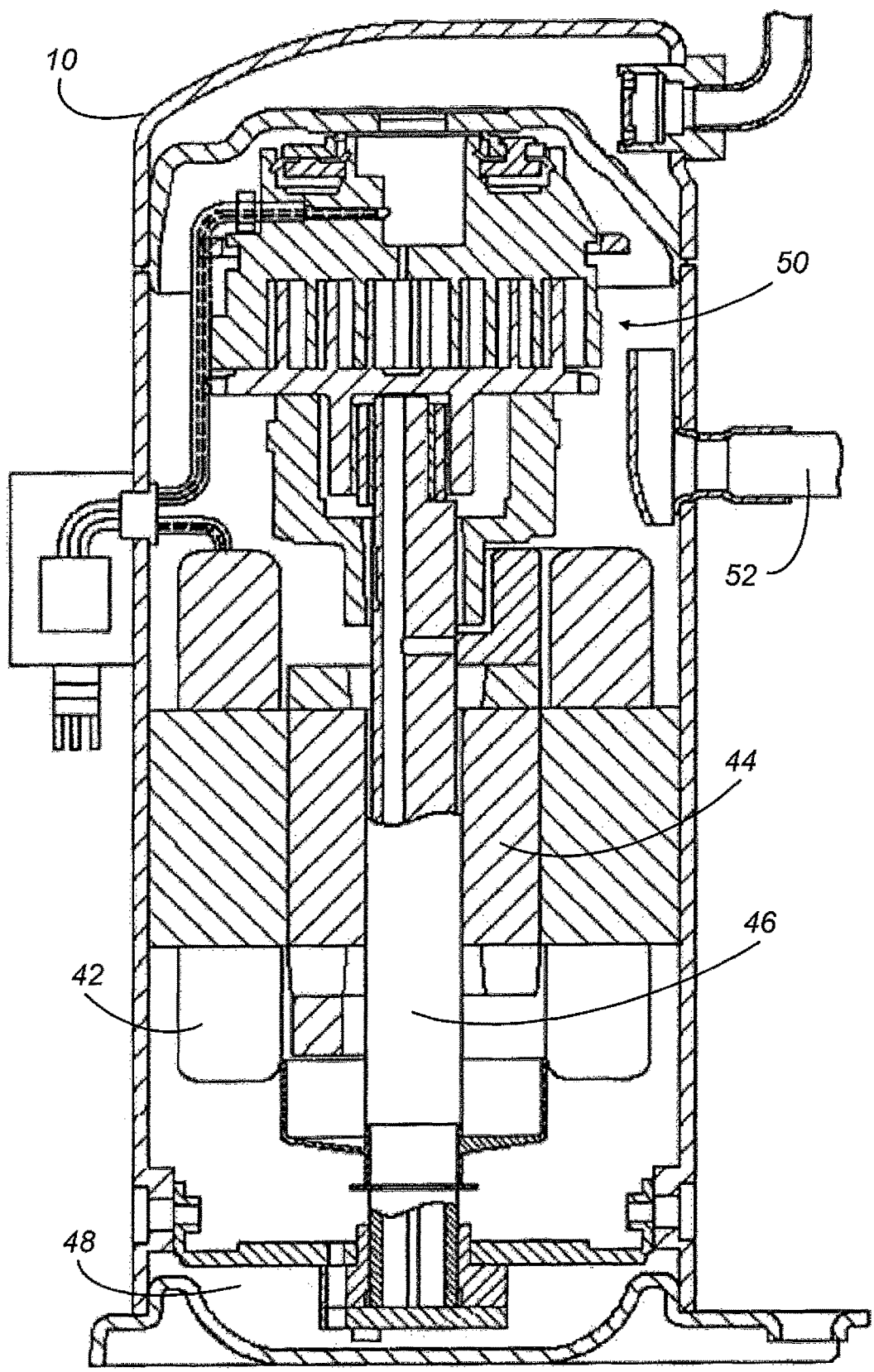
FIG. 4 is a cross-sectional view of an example compressor according to the present disclosure.

In the example heat pump systems 5, the compressor 10 is depicted as a scroll compressor and the compression mechanism includes a scroll having a pair of intermeshing scroll members, as shown in FIG. 4. The teachings of the present disclosure, however, also apply to other types of compressors utilizing other types of compression mechanisms.

For example, the compressor 10 may be a reciprocating compressor and the compression mechanism may include at least one piston driven by a crank shaft for compressing refrigerant vapor. As another example, the compressor 10 may be a rotary compressor and the compression mechanism may include a vane mechanism for compressing refrigerant vapor. Further, while a specific type of heat pump system is shown in FIGS. 1A and 1B (a refrigeration system), the present teachings are also applicable to other types of heat pump systems, including other types of refrigeration systems, HVAC systems, chiller systems, and other suitable types of heat pump systems where crankcase heating is used.

Refrigerant vapor from the compressor 10 is delivered to a condenser 12 where the refrigerant vapor is liquefied at high pressure, thereby rejecting heat to the outside air. A condenser fan 13 may be implemented to regulate airflow past the condenser 12. The liquid refrigerant exiting the condenser 12 is delivered to an evaporator 16 through an expansion valve 14. The expansion valve 14 may be a mechanical, thermal, or electronic valve for controlling super heat of the refrigerant entering the compressor 10.

The refrigerant passes through the expansion valve 14 where a pressure drop causes the high pressure liquid refrigerant to achieve a lower pressure combination of liquid and vapor. As hot air moves across the evaporator 16, the low pressure liquid turns into gas, thereby removing heat from the hot air adjacent the evaporator 16. While not shown, a fan is generally provided to facilitate airflow past the evaporator 16. The low pressure gas is delivered to the compressor 10 where it is compressed to a high pressure gas, and delivered to the condenser 12 to start the heat pump cycle again.

With reference to FIGS. 1A, 1B, 2 and 3, the compressor 10 may be driven by a variable frequency drive (VFD) 22 that is housed in an enclosure 20. Variable frequency drives are also referred to as inverters and inverter drives. The enclosure 20 may be located near or away from the compressor 10.

Figure 2:
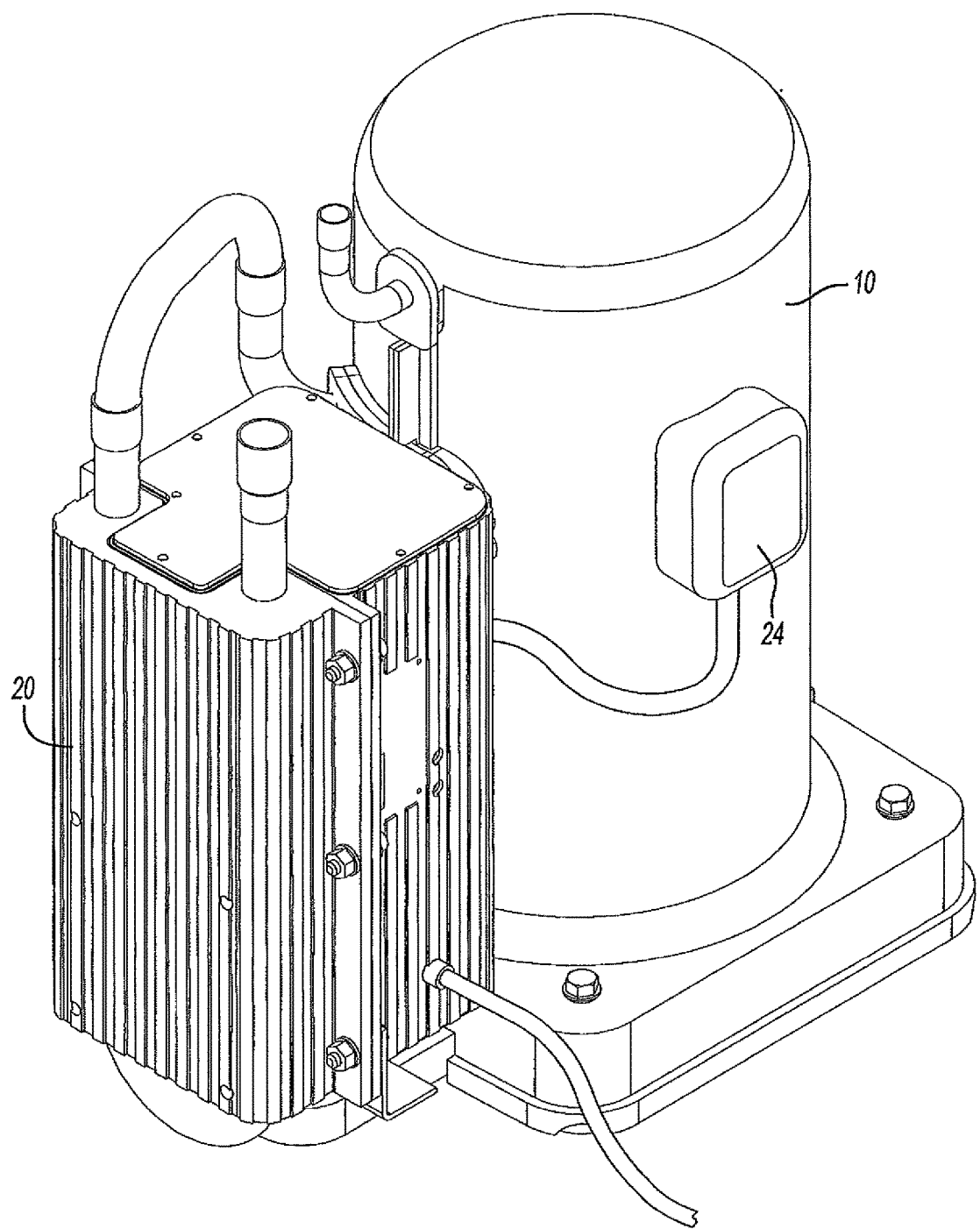
FIG. 2 is a perspective view of a compressor with a variable frequency drive according to the present disclosure.
Figure 3:
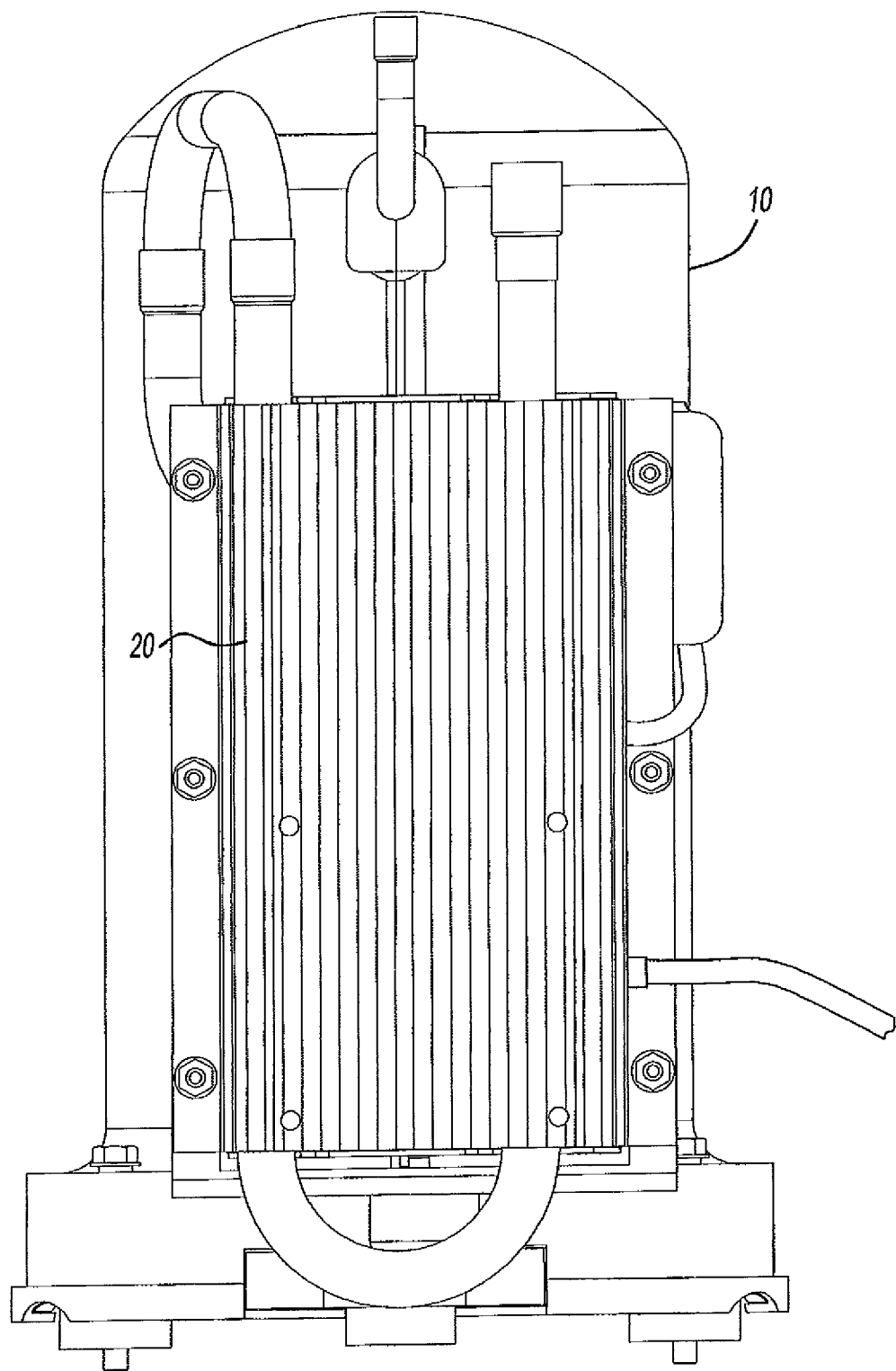
FIG. 3 is another perspective view of a compressor with a variable frequency drive according to the present disclosure.

For example, with reference to FIG. 1A, the VFD 22 is shown near the compressor 10. For another example, as shown in FIGS. 2 and 3, the VFD 22 may be attached (as part of the enclosure 20) to the compressor 10. For yet another example, with reference to FIG. 1B, the VFD 22 may be located away from the compressor 10 by a separation 17. The separation 17 may include, for example, a wall of a building. In other words, the VFD 22 may be located inside a building and the compressor 10 may be located outside of the building or in a different room than the compressor 10.

The VFD 22 receives an alternating current (AC) voltage from a power supply 18 and delivers AC voltage to the compressor 10. The VFD 22 may include a control module 25 with a processor and code operable to modulate and control the frequency and/or amplitude of the AC voltage delivered to an electric motor of the compressor 10.

The control module 25 may include a computer readable medium storing data including the code executed by a processor to modulate and control the frequency and/or amplitude of voltage delivered to the compressor 10 and to execute and perform the crankcase heating and control functions disclosed herein. By modulating the frequency and/or amplitude of voltage delivered to the electric motor of the compressor 10, the control module 25 may modulate and control the speed, and consequently the capacity, of the compressor 10. The control module 25 also regulates operation of the condenser fan 13.

The VFD 22 may include solid state electronic circuitry to modulate the frequency and/or amplitude of the AC voltage delivered to the compressor 10. Generally, the VFD 22 converts the input AC voltage from AC to DC, and converts from DC back to AC at a desired frequency and/or amplitude. For example, the VFD 22 may directly rectify the AC voltage with a full-wave rectifier bridge. The VFD 22 may switch the voltage using insulated gate bipolar transistors (IGBTs) or thyristors to achieve the desired output (e.g., frequency, amplitude, current, and/or voltage). Other suitable electronic components may be used to modulate the frequency and/or amplitude of the AC voltage from the power supply 18.

Piping from the evaporator 16 to the compressor 10 may be routed through the enclosure 20 to cool the electronic components of the VFD 22 within the enclosure 20. The enclosure 20 may include a cold plate 15. Suction gas refrigerant may cool the cold plate 15 prior to entering the compressor 10 and thereby cool the electrical components of the VFD 22. In this way, the cold plate 15 may function as a heat exchanger between suction gas and the VFD 22 such that heat from the VFD 22 is transferred to suction gas prior to the suction gas entering the compressor 10.

However, as shown in FIG. 1B, the enclosure 20 may not include the cold plate 15 and thus the VFD 22 may not be cooled by suction gas refrigerant. For example, the VFD 22 may be air cooled, such as with or without a fan. As a further example, the VFD 22 may be air cooled by the condenser fan 13, provided the VFD 22 and the condenser 12 are located within sufficient proximity to each other. As shown in FIGS. 2 and 3, voltage from the VFD 22 may be delivered to the compressor 10 via a terminal box 24 attached to the compressor 10.

FIG. 4 includes an example cross-sectional view of the compressor 10. While a variable speed scroll compressor is shown and discussed, the present teachings of the present application are also applicable to other types of compressors, such as reciprocating compressors, and rotary compressors.

The compressor 10 includes a stator 42 that magnetically turns a rotor 44 to drive a crankshaft 46 in an on state. Power flow to the stator 42 controls magnetization of the stator 42. Power can also be applied to the stator 42 to control magnetization such that the rotor 44 is not driven while power is applied to the stator 42, such as for crankcase heating.

A lubricant sump 48 includes lubricant (e.g., oil) that lubricates moving parts of the compressor 10 such as the crankshaft 46. The compressor 10 also includes a fixed scroll and an orbiting scroll, generally indicated by 50. When the scrolls 50 are meshed, rotation of the crankshaft 46 drives one of the scrolls 50 to compress refrigerant that is received through a suction tube 52. The scrolls 50 can be unmeshed under some circumstances such that the scrolls 50 do not compress refrigerant.

An ambient temperature sensor 30 measures outdoor ambient temperature (OAT) outside of the compressor 10 and/or the enclosure 20. In various implementations, the ambient temperature sensor 30 may be included as part of an existing system and thus be available via a shared communication bus.

A compressor temperature sensor 32 measures a temperature (Compressor temperature) of the compressor 10. For example only, the compressor temperature sensor 32 may measure temperature at the discharge line of the compressor 10, which may be referred to as discharge line temperature (DLT). Other examples of the temperature measured by the compressor temperature sensor 32 include, but are not limited to, temperature in the lubricant sump 48, temperature of the stator 42, a temperature at a top portion of the shell of the compressor 10, a temperature at a bottom portion of the shell, a temperature at a point between the top and bottom portions of the shell, and another suitable compressor temperatures. The temperature of the stator 42 may be measured or derived, for example, based on resistance of the motor windings.

The control module 25 also regulates a lubricant temperature in the lubricant sump 48 of the compressor 10. More specifically, the control module 25 regulates compressor crankcase heating (CCH) to control the lubricant temperature. In the present application, the stator 42 operates as a crankcase heater and heats the crankcase of the compressor 10 and therefore the lubricant, as discussed further below.

Figure 5:
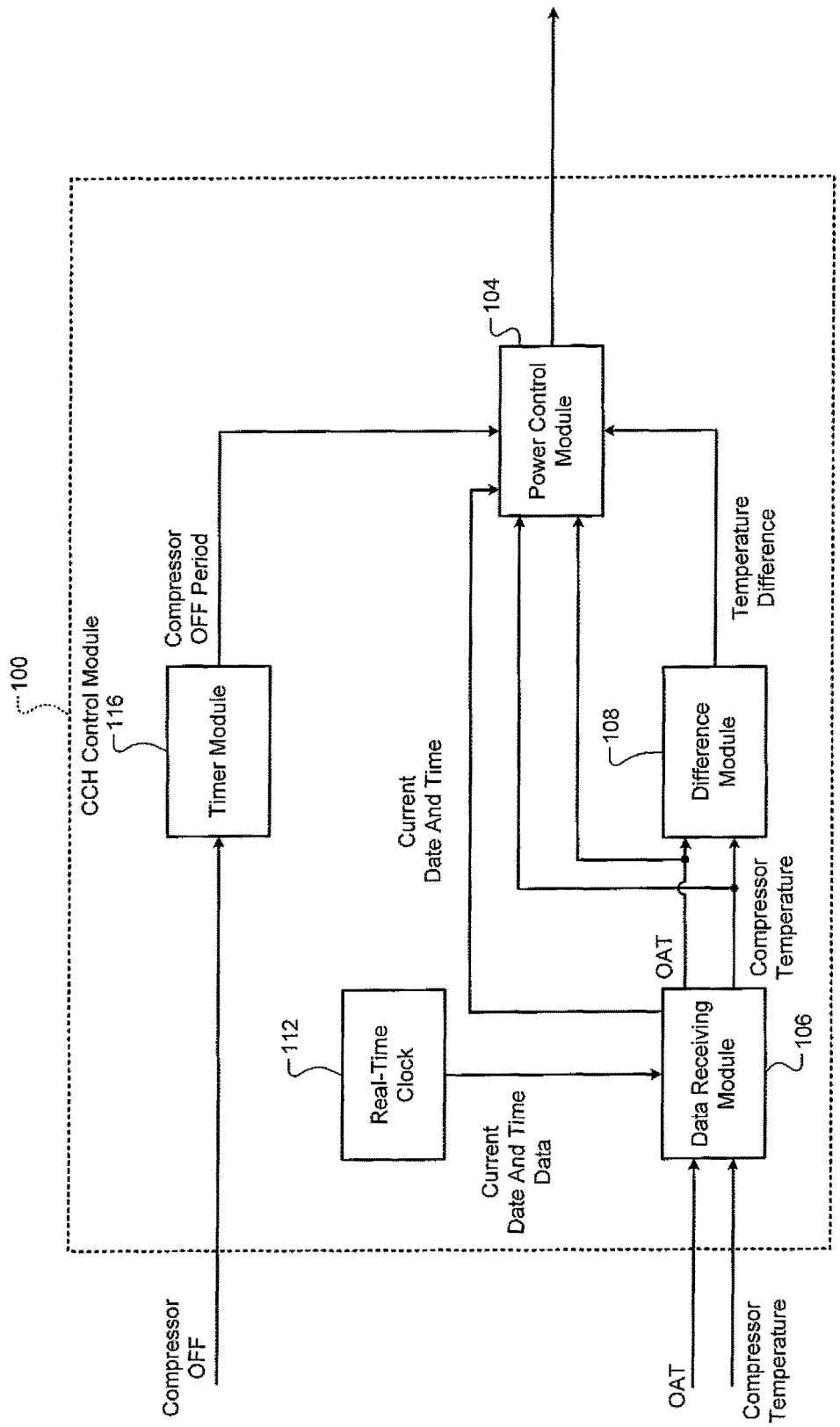
FIG. 5 is a functional block diagram of an example implementation of a crankcase heating control module according to the present disclosure.

Referring now to FIG. 5, a functional block diagram of an example implementation of a compressor crankcase heating (CCH) control module 100 is presented. The CCH control module 100 may include, be a part of, or be independent of the control module 25.

A power control module 104 controls whether crankcase heating is on or off. The power control module 104 generally maintains crankcase heating off while the compressor 10 is on. The power control module 104 may control whether crankcase heating is on or off based on the OAT, the compressor temperature, both the OAT and the compressor temperature, current date and time data, and/or one or more other suitable parameters.

A data receiving module 106 may receive the OAT, the compressor temperature, and the current date and time data and output the OAT, the compressor temperature, and the current date and time. The data receiving module 106 may filter, digitize, buffer, and/or perform one or more processing actions on the received data.

A difference module 108 may determine a temperature difference based on the OAT and the compressor temperature. For example, the difference module 108 may set the temperature difference equal to the compressor temperature minus the OAT. While setting the temperature difference equal to the compressor temperature minus the OAT is discussed, the temperature difference may alternatively be set equal to the OAT minus the compressor temperature or an absolute value of a difference between the compressor temperature and the OAT.

A real-time clock module 112 may track and provide the current date and time data. The current date and time data may indicate a current date (date, month, year) and a current time. While the real-time clock module 112 is shown as being implemented within the CCH control module 100, the current date and time data may be provided in another manner. For example, the current date and time data may be provided by a thermostat or via a network connection (e.g., by a server, a mobile device, or another suitable type of external device including a processor).

Figure 6:
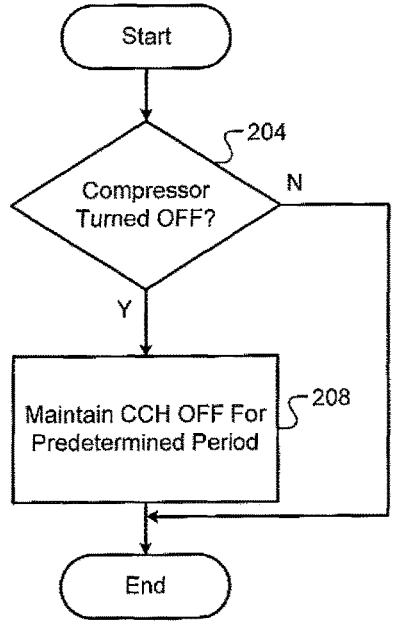
FIGS. 6-14 are flowcharts depicting example methods of controlling crankcase heating according to the present disclosure.

As stated above, the power control module 104 controls whether crankcase heating is performed based on the OAT, the compressor temperature, both the OAT and the compressor temperature, current date and time data, and/or one or more other suitable parameters. FIG. 6 is a flowchart depicting an example method of controlling crankcase heating.

Referring now to FIG. 6, control may begin with 204 when the compressor 10 is on and compressor crankcase heating is off. At 204, the power control module 104 determines whether the compressor 10 has transitioned to the off state. If 204 is false, control may remain at 204. If 204 is true, the power control module 104 may maintain compressor crankcase heating off for a first predetermined period at 208. In this manner, the power control module 104 may maintain compressor crankcase heating off for the first predetermined period after the compressor 10 is turned off. The first predetermined period may be calibratable (i.e., is able to be calibrated) and may be set based on experimental data taken regarding the migration rate of liquid into the compressor shell after the compressor 10 is turned off relative to the volume of the compressor shell. For example only, the first predetermined period may be between approximately 30 minutes and approximately 3 hours or another suitable period. The power control module 104 may use (i.e., turn on) compressor crankcase heating when the compressor 10 is off, such as after the first predetermined period has passed.

Figure 7:
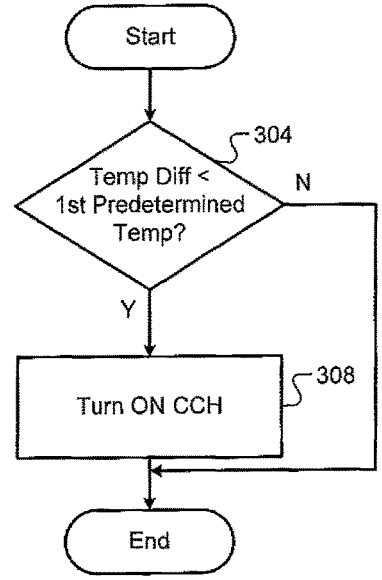

FIG. 7 is a flowchart depicting another example method of controlling compressor crankcase heating. Referring now to FIG. 7, control may begin with 304 where compressor crankcase heating is off and the compressor 10 is off. At 304, the power control module 104 determines whether the temperature difference is less than a first predetermined temperature. In other words, the power control module 104 may determine whether the compressor temperature minus the OAT is less than the first predetermined temperature at 304. If 304 is false, the power control module 104 may leave the on/off state of compressor crankcase heating unchanged. If 304 is true, the power control module 104 may turn compressor crankcase heating on at 308. The first predetermined temperature may be calibratable and may be set based on experimental data taken regarding temperatures where cold start and/or liquid flood-back occurs. For example only, the first predetermined temperature may be approximately 0 (zero) degrees Fahrenheit or another suitable temperature below which cold start and/or liquid flood-back may occur.

The power control module 104 may maintain compressor crankcase heating on, for example, for a second predetermined period and/or, as discussed further below, until the temperature difference becomes greater than a second predetermined temperature. The second predetermined period may be calibratable and may be set, for example, based on experimental data taken regarding a period of compressor crankcase heating necessary to increase the temperature difference to greater than the second predetermined temperature. The second predetermined period may be a fixed value or a variable value. In the case of the second predetermined period being a variable value, the power control module 104 may determine the second predetermined period, for example, as a function of the compressor temperature and/or the OAT. In the case of the second predetermined temperature being a fixed value, the second predetermined temperature may be, for example, approximately 10 degrees Fahrenheit, approximately 15 degrees Fahrenheit, approximately 20 degrees Fahrenheit, or another suitable temperature that is greater than the first predetermined temperature.

Figure 8:
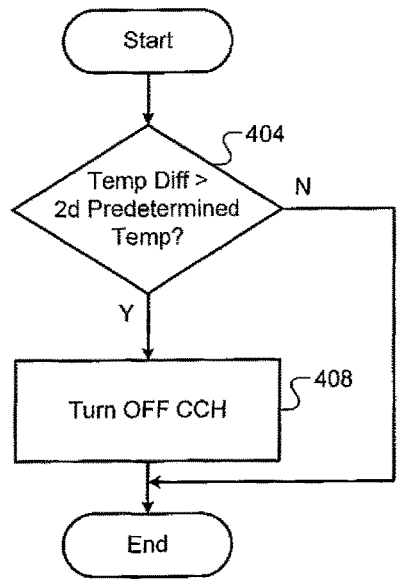

FIG. 8 is a flowchart depicting another example method of controlling compressor crankcase heating. Referring now to FIG. 8, control may begin with 404 where compressor crankcase heating is on and the compressor 10 is off. At 404, the power control module 104 determines whether the temperature difference is greater than the second predetermined temperature. In other words, the power control module 104 may determine whether the compressor temperature minus the OAT is greater than the second predetermined temperature at 404. If 404 is false, the power control module 104 may maintain the on/off state of compressor crankcase heating unchanged. If 404 is true, the power control module 104 may turn compressor crankcase heating off at 408. As stated above, the second predetermined temperature may be calibratable and may be set to, for example, approximately 10 degrees Fahrenheit, approximately 15 Fahrenheit, approximately 20 degrees Fahrenheit, or another suitable temperature that is greater than the first predetermined temperature.

Figure 9:
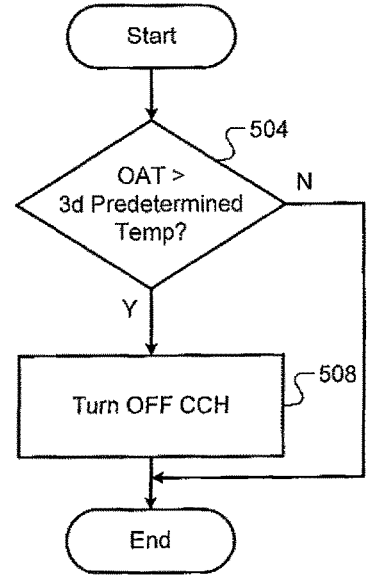

FIG. 9 is a flowchart depicting another example method of controlling compressor crankcase heating. Referring now to FIG. 9, control may begin with 504 where the compressor 10 is off. At 504, the power control module 104 determines whether the OAT is greater than a third predetermined temperature. If 504 is false, the power control module 104 may maintain the on/off state of compressor crankcase heating unchanged. If 504 is true, the power control module 104 may turn compressor crankcase heating off at 508. The third predetermined temperature may be calibratable and may be set, for example, based on experimental data taken regarding temperatures where compressor crankcase heating is not needed (e.g., where cold start and liquid-flood back are not a concern). For example only, the third predetermined temperature may be set to approximately 75 degrees Fahrenheit or another suitable temperature.

Figure 10:
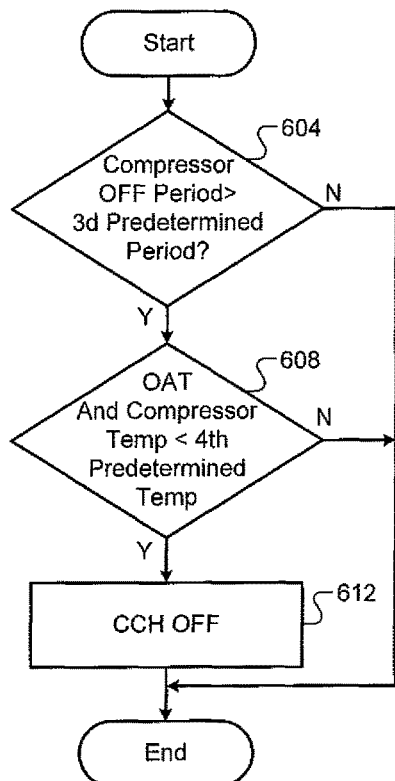

FIG. 10 is a flowchart depicting another example method of controlling compressor crankcase heating. Referring now to FIG. 10, control may begin with 604 where the power control module 104 determines whether a period that the compressor 10 has been off is greater than a third predetermined period. The period that the compressor 10 has been off (continuously) since the compressor 10 was last turned off can be referred to as a compressor off period. A timer module 116 (see FIG. 5) may reset and start the compressor off period in response to receipt of an indicator that the compressor 10 has been turned off.

If the compressor off period is greater than the third predetermined period, control may continue with 608. If the compressor off period is not greater than the second predetermined period, the power control module 104 may leave the on/off state of compressor crankcase heating unchanged. The third predetermined period may be calibratable and may be set, for example, to approximately 3 weeks or another suitable period.

At 608, the power control module 104 may determine whether the OAT and the compressor temperature are both less than a fourth predetermined temperature. If 608 is true, the power control module 104 may turn the CCH off at 612. If 608 is false, the power control module 104 may maintain the on/off state of compressor crankcase heating unchanged. The fourth predetermined temperature may be calibratable and may be set, for example, to approximately 55 degrees Fahrenheit or another suitable temperature that is less than the third predetermined temperature.

The compressor off period being greater than the second predetermined period may indicate that the heat pump system (and more specifically air conditioning) has been shut down for the season (e.g., seasonally for winter). The compressor temperature and/or the OAT being less than the fourth predetermined temperature may be used to verify that the compressor 10 has been shut down. In various implementations, 608 may be omitted, and the power control module 104 may turn compressor crankcase heating off in response to a determination that the compressor off period is greater than the second predetermined period.

Figure 11:
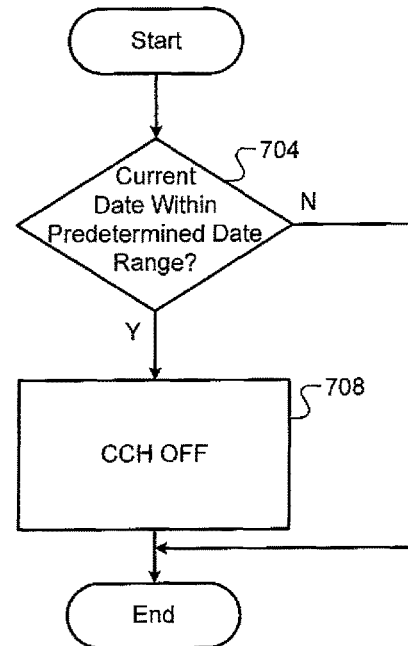

FIG. 11 is a flowchart depicting another example method of controlling compressor crankcase heating. Referring now to FIG. 11, control may begin with 704 where the compressor 10 is off. At 704, the power control module 104 determines whether the current date indicated in the current date and time data is within a predetermined date range. If 704 is false, control may leave the on/off state of compressor crankcase heating unchanged. If 704 is true, the power control module 104 may turn compressor crankcase heating off at 708. The predetermined date range may be calibratable and may be set, for example, to approximately November 1 through approximately April 1, yearly, or another suitable date range when the heat pump system (and more specifically air conditioning) is expected to remain off.

Figure 12:
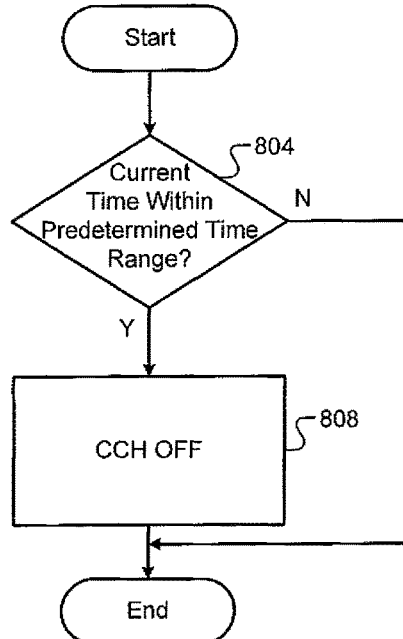

FIG. 12 is a flowchart depicting another example method of controlling compressor crankcase heating. Referring now to FIG. 12, control may begin with 804 where the compressor 10 is off. At 804, the power control module 104 determines whether the current time indicated in the current date and time data is within a predetermined time range. If 804 is false, the power control module 104 may leave the on/off state of compressor crankcase heating unchanged. If 804 is true, the power control module 104 may turn compressor crankcase heating off at 808. The predetermined time range may be calibratable and may be set, for example, to approximately 12:00 am to approximately 10:00 am, daily, or another suitable daily time range when the heat pump system (and more specifically air conditioning) is expected to remain off.

Figure 13:
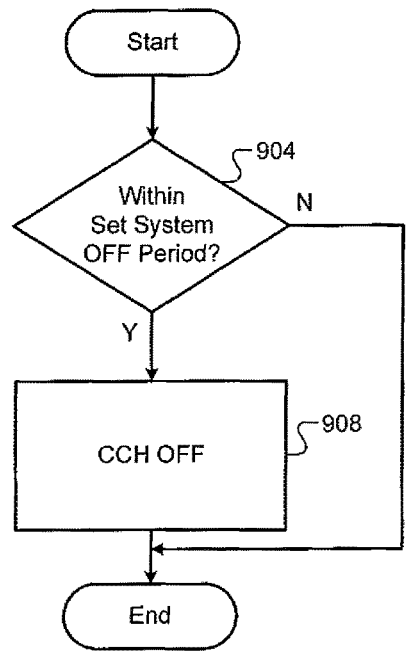

FIG. 13 is a flowchart depicting another example method of controlling compressor crankcase heating. Referring now to FIG. 13, control may begin with 904 where the compressor 10 is off. At 904, the power control module 104 determines whether the current date and time is within a predetermined system OFF period. The predetermined system OFF period may refer to a period from entry into the predetermined system OFF period when the heat pump system will remain off. The predetermined system OFF period may be provided by a user via the thermostat or via a network connection (e.g., by a server or a mobile device).

The power control module 104 may record the current date and time when the predetermined system OFF period is provided. If the current date and time is within the predetermined system OFF period following the recorded date and time, the power control module 104 may turn compressor crankcase heating off at 908. If the current date and time is outside of the predetermined system OFF period following the recorded date and time, the power control module 104 may leave the on/off state of compressor crankcase heating unchanged.

Figure 14:
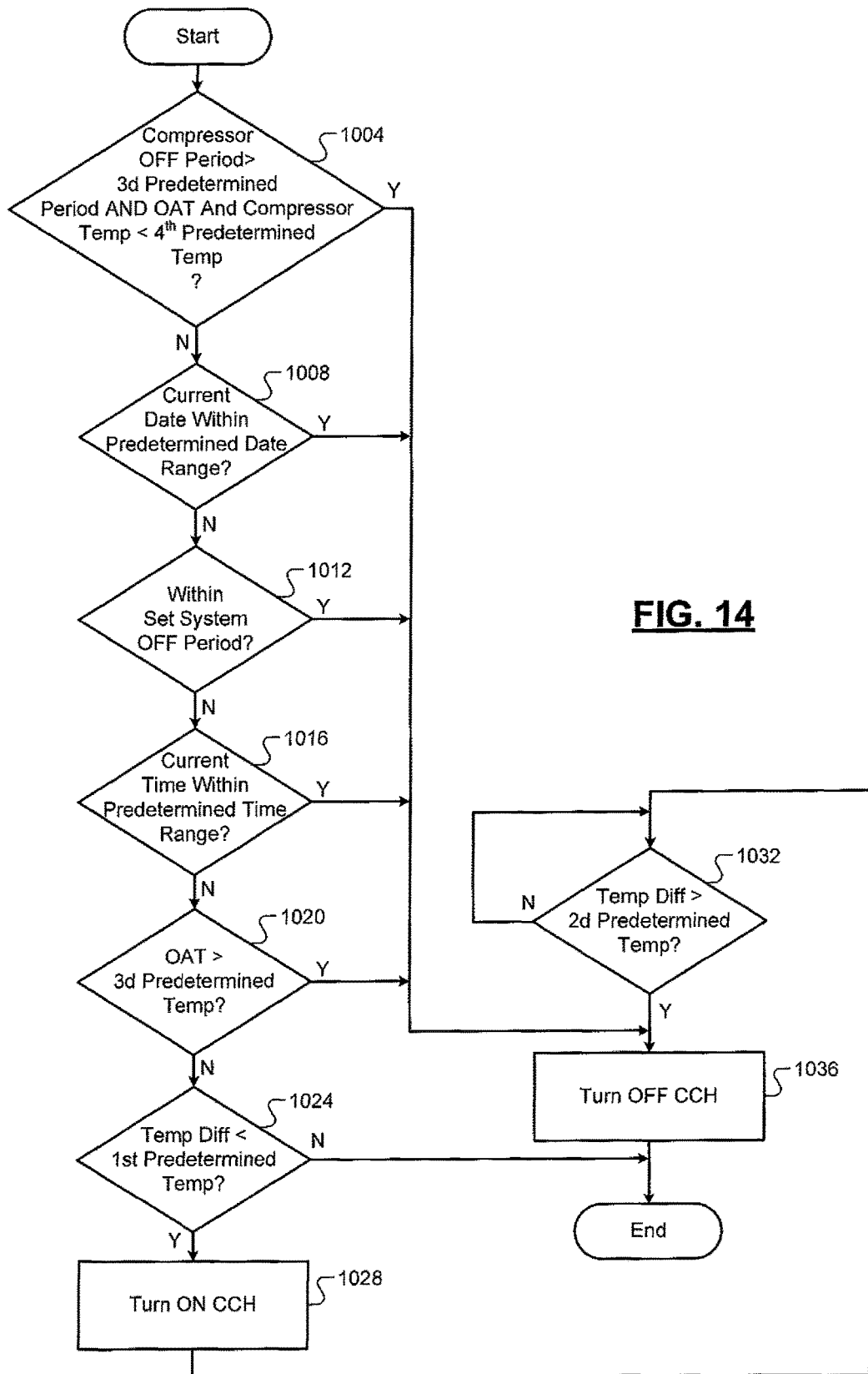

FIG. 14 is a flowchart depicting another example method of controlling compressor crankcase heating. Referring now to FIG. 14, control may begin with 1004 where the compressor 10 is off. Compressor crankcase heating may also be off at 1004. At 1004, the power control module 104 determines whether the compressor off period is greater than the third predetermined period and the OAT and the compressor temperature are less than the fourth predetermined temperature. If 1004 is true, the power control module 104 may turn compressor crankcase heating off at 1036. If 1004 is false, control may continue with 1008.

At 1008, the power control module 104 determines whether the current date indicated by the current date and time data is within the predetermined date range. If 1008 is true, the power control module 104 may turn compressor crankcase heating off at 1036. If 1008 is false, control may continue with 1012. The power control module 104 determines whether the current date and time is within the predetermined system OFF period at 1012. If 1012 is true, the power control module 104 may turn compressor crankcase heating off at 1036. If 1012 is false, control may continue with 1016.

The power control module 104 determines whether the current time indicated by the current date and time data is within the predetermined time range at 1016. If 1016 is true, the power control module 104 may turn compressor crankcase heating off at 1036. If 1016 is false, control may continue with 1020. At 1020, the power control module 104 determines whether the OAT is greater than the third predetermined temperature. If 1020 is true, the power control module 104 may turn compressor crankcase heating off at 1036. If 1020 is false, control may continue with 1024.

At 1024, the power control module 104 determines whether the temperature difference is less than the first predetermined temperature. If 1024 is true, the power control module 104 may turn compressor crankcase heating on at 1028, and control may continue with 1032. If 1024 is false, control may end.

At 1032, the power control module 104 determines whether the temperature difference is greater than the second predetermined temperature. If 1032 is true, the power control module 104 may turn compressor crankcase heating off at 1036. If false, the power control module 104 may leave compressor crankcase heating on and remain at 1032. While the above order has been provided for 1004-1036, the order of execution of one or more of 1004-1036 may be changed.

Figure 15A:
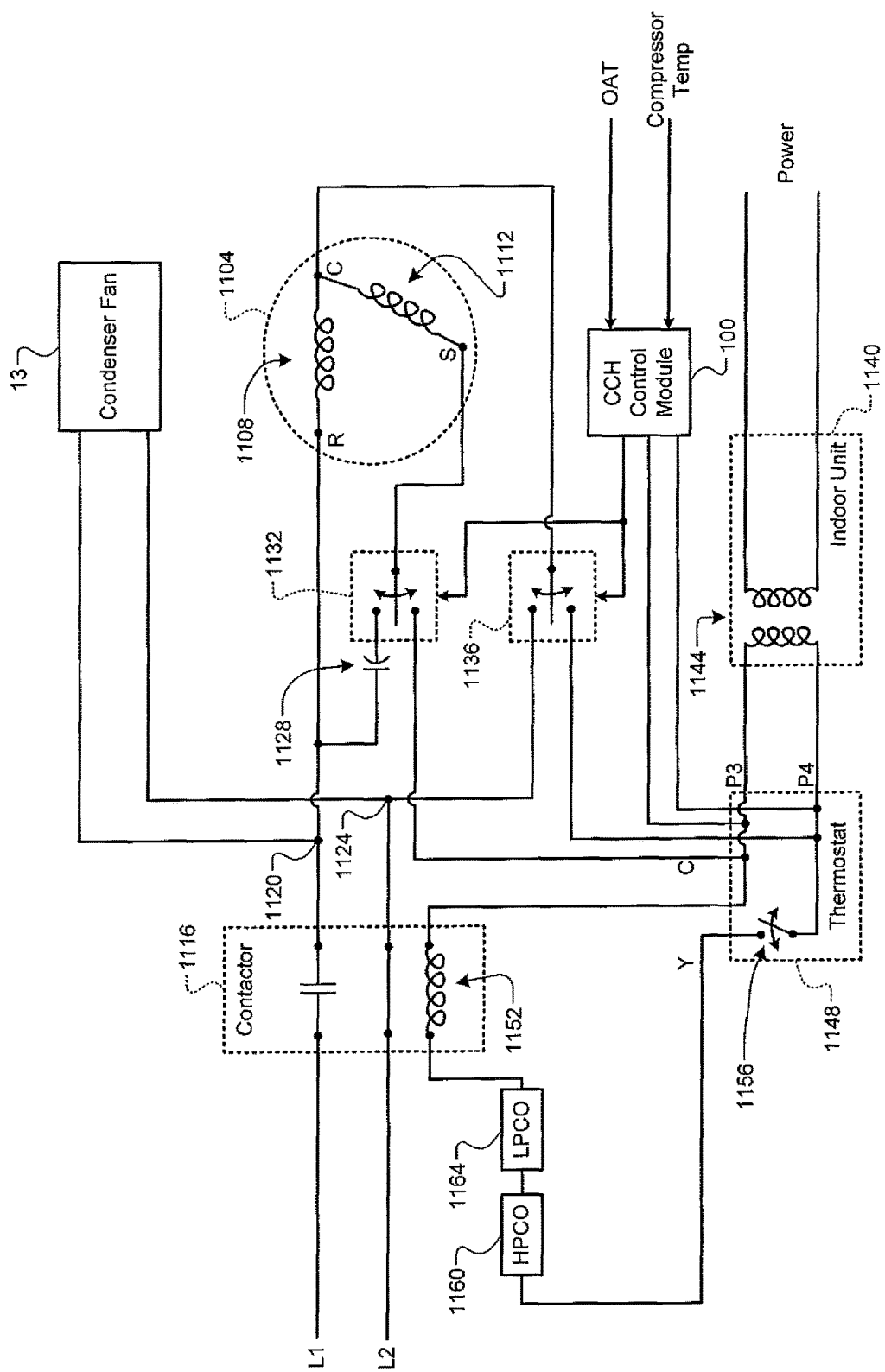
FIGS. 15A, 15B, and 15C are functional block diagrams of example crankcase heating control systems of example single phase heat pump systems according to the present disclosure.
Figure 15B:
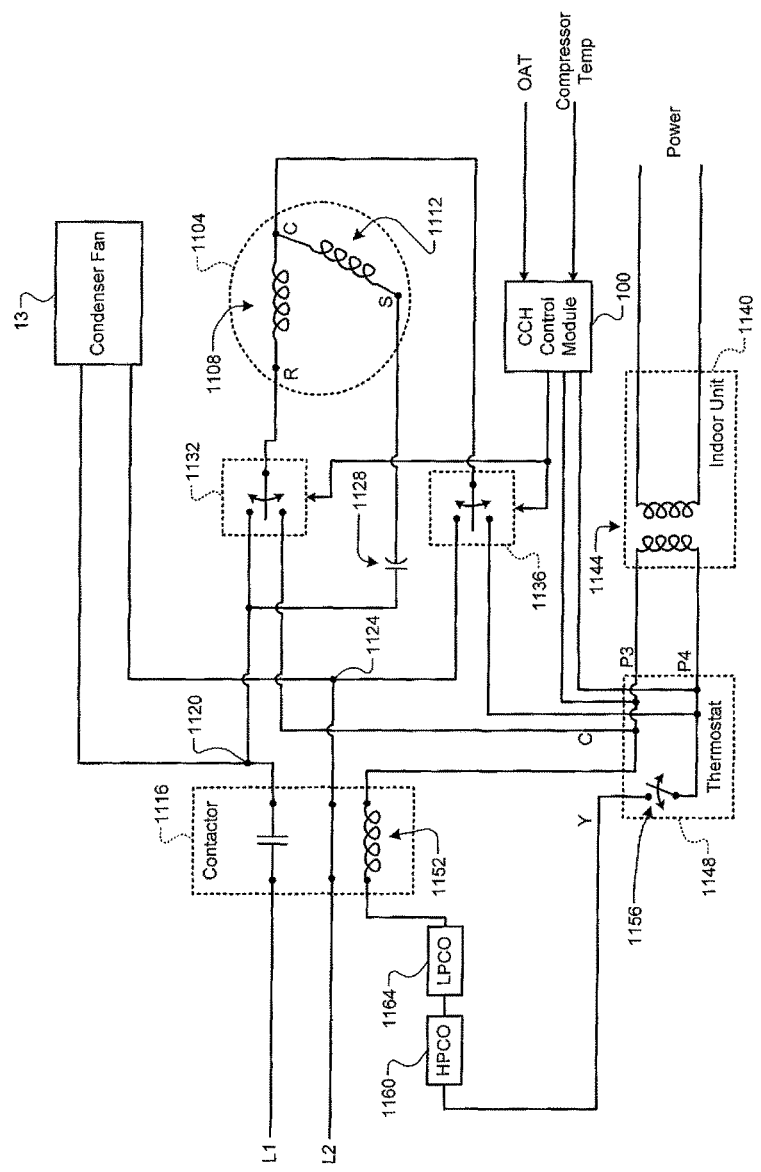
Figure 15C:
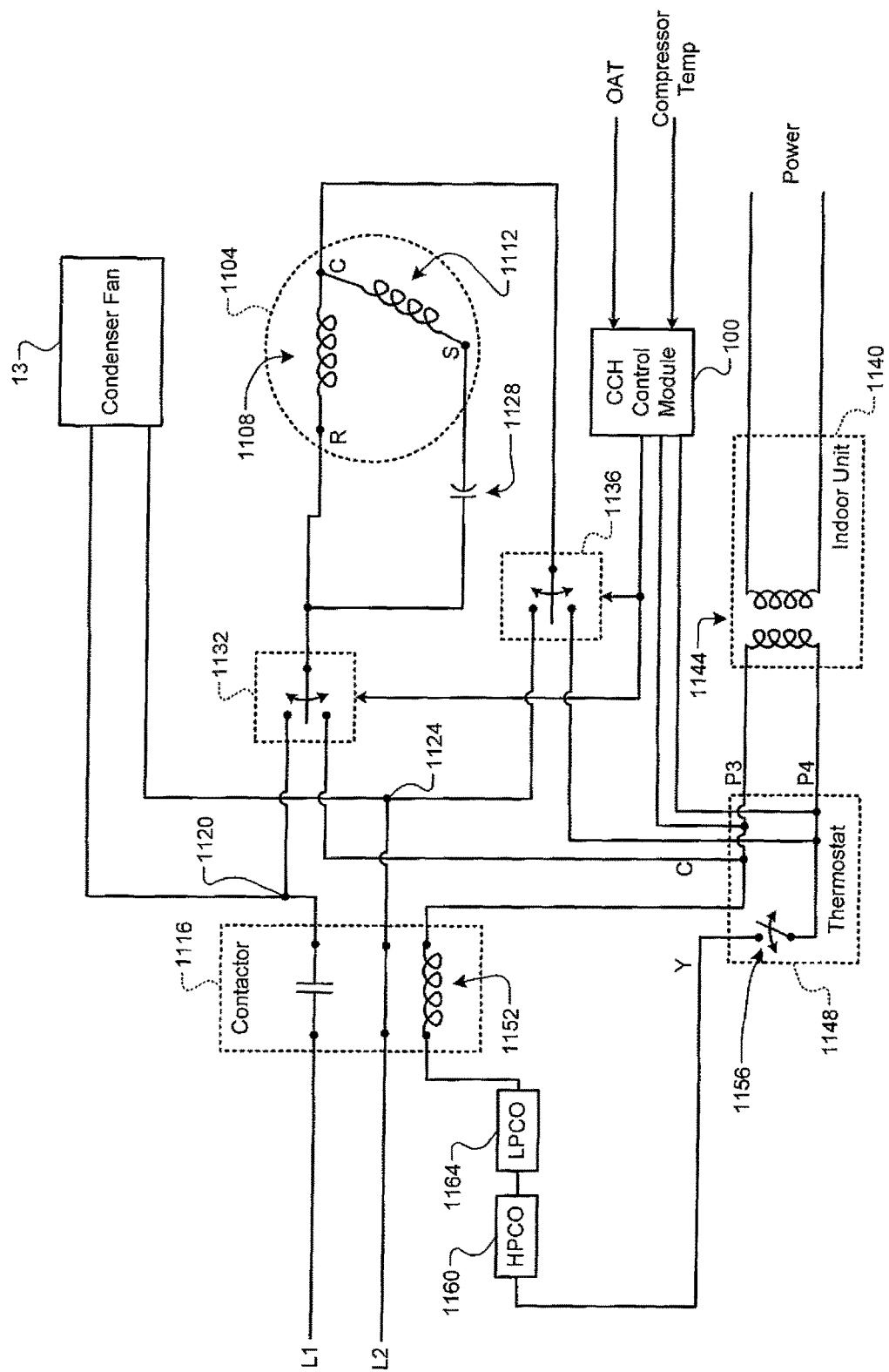

FIGS. 15A, 15B, and 15C are functional block diagrams of example compressor crankcase heating systems of example single phase heat pump systems. Specifically, a stator 1104 of an electric motor of the compressor 10 acts as a crankcase heater. The stator 1104 includes a run winding 1108 that is connected between a run node (R) and a common node (C). The stator 1104 also includes a start winding 1112 that is connected between a start node (S) and the common node (C).

In the example of FIG. 15A, compressor crankcase heating is performed using the start winding 1112. In the example of FIG. 15B, compressor crankcase heating is performed using the run winding 1108. In the example of FIG. 15C, compressor crankcase heating is performed using both the start winding 1112 and the run winding 1108.

Referring now to FIG. 15A, first and second power lines (L1 and L2) are connected to first and second inputs of a contactor 1116. While the contactor 1116 is shown and discussed, one or more other suitable types of switching devices may be used. The first and second power lines receive a first voltage, such as approximately 220 Volts alternating current (VAC) or another voltage suitable for operation of the compressor 10. For example, the first and second power lines may receive power output by the VFD 22. While the present application will be discussed in terms of the first voltage being an AC voltage, the first voltage may instead be a direct current (DC) voltage.

First and second outputs of the contactor 1116 are connected to first and second nodes 1120 and 1124. The contactor 1116 selectively connects and disconnects its first input to/from its first output and its second input to/from its second output, as discussed further below. The electric motor of the condenser fan 13 may be connected to the first and second nodes 1120 and 1124.

The first node 1120 is connected to the run node (R). A capacitor 1128 is connected between the first node 1120 and a first input of a first switching device 1132. A second input of the first switching device 1132 is connected to a third power line (P3), and an output of the first switching device 1132 is connected to the start node (S). The first switching device 1132 connects either its first input or its second input to its output at a given time.

The second node 1124 is connected to a first input of a second switching device 1136. A second input of the second switching device 1136 is connected to a fourth power line (P4). An output of the second switching device 1136 is connected to the common node (C). The first switching device 1132 connects either its first input or its second input to its output at a given time.

The third and fourth power lines (P3 and P4) receive a second voltage that is less than the first voltage received by the first and second power lines (L1 and L2). The second voltage is used to perform compressor crankcase heating while the compressor 10 is off. For example only, the second voltage may be approximately 24 VAC or another suitable voltage that is less than the first voltage. The second voltage may also be used to power the CCH control module 100.

Using second voltage for compressor crankcase heating is more efficient than using the first voltage. Additionally, as the motor of the condenser fan 13 may also be connected to the first and second nodes 1120 and 1124, compressor crankcase heating may be performed without the condenser fan 13 being turned on. This further increases efficiency. While use of an AC voltage for the second voltage is discussed, in various implementations, such as in the examples of FIGS. 16 and 17A-C, a direct current (DC) voltage that is less than (e.g., a peak value of) the first voltage may be used.

The second voltage may be supplied by an indoor unit 1140 or another suitable power supply. For example, the indoor unit 1140 receives alternating current (AC) power, such as a 110 VAC input, from a utility. The indoor unit 1140 includes various components, such as the expansion valve 14, the evaporator 16, and a blower or fan.

The indoor unit 1140 also includes a transformer 1144. The transformer 1144 outputs the second voltage based on the power input to the transformer 1144. For example, the transformer 1144 may generate 24 VAC based on a 110 VAC input. The indoor unit 1140 outputs the second voltage to a thermostat 1148.

The thermostat 1148 controls the contactor 1116. For example, the third power line may be connected to a first end of a controlling element 1152 of the contactor 1116. A second end of the controlling element 1152 of the contactor 1116 may be connected to the fourth power line via a switching element 1156 of the thermostat 1148.

Opening/closing of the switching device 1156 controls current flow through the controlling element 1152 of the contactor 1116. Current flow through the controlling element 1152 (when the switching device 1156 is closed) causes the first input of the contactor 1116 to be connected to first output of the contactor and causes the second input of the contactor 1116 to be connected with the second output of the contactor 1116. Lack of current flow through the controlling element 1152 (e.g., when the switching device 1156 is open) causes the first input of the contactor 1116 to be disconnected from first output of the contactor 1116 and causes the second input of the contactor 1116 to be disconnected from the second output of the contactor 1116.

The thermostat 1148 opens and closes the switching device 1156 based on a temperature of air within a space. For example, the thermostat 1148 may close the switching device 1156 when the temperature of air within the space is greater than a target temperature for the air within the space to cool the space. The thermostat 1148 may open the switching device 1156, for example, when the temperature of the air within the space is less than the target temperature by at least a predetermined amount. The thermostat 1148 closes the switching device 1156 to turn the compressor 10 on. The thermostat 1148 opens the switching device 1156 to turn the compressor 10 off.

A high-pressure cutoff (HPCO) device 1160 and a low-pressure cutoff (LPCO) device 1164 may be connected between the second end of the controlling element 1152 and the switching device 1156. The HPCO device 1160 may disable current flow through the controlling element 1152 of the contactor 1116 (to disconnect the first and second inputs from the first and second outputs of the contactor 1116, respectively) when an output pressure of the compressor 10 is greater than a first predetermined pressure. The output pressure of the compressor 10 may also be referred to as a discharge pressure.

The LPCO device 1164 may disable current flow through the controlling element 1152 of the contactor 1116 (to disconnect the first and second inputs from the first and second outputs of the contactor 1116, respectively) when an input pressure of the compressor 10 is less than a second predetermined pressure. The input pressure of the compressor 10 may also be referred to as a suction pressure. While the HPCO device 1160 and the LPCO device 1164 are shown and discussed, one or both of the HPCO device 1160 and the LPCO device 1164 may be omitted in various implementations.

As noted above, compressor crankcase heating is performed using the run winding 1108 in the example of FIG. 15B. Referring now to FIG. 15B, the first input of the first switching device 1132 may be connected to the first node 1120, and the third power line (P3) may be connected to the second input of the first switching device 1132. The output of the first switching device 1132 may be connected to the run node (R). With this configuration, the second voltage can be applied only to the run winding 1108 for compressor crankcase heating. In FIG. 15A, the second voltage can be applied only to the start winding 1112 for compressor crankcase heating.

Compressor crankcase heating is performed using both the start winding 1112 and the run winding 1108 in the example of FIG. 15C. Referring now to FIG. 15C, the first input of the first switching device 1132 is connected to the first node 1120, the second input of the first switching device 1132 is connected to the third power line (P3), and the output of the first switching device 1132 is connected to the run node (R). The capacitor 1128 is connected between the output of the first switching device 1132 and the start note (S). Thus, in FIG. 15C, power can be applied to both the run winding 1108 and the start winding 1112 for compressor crankcase heating.

As noted above, a DC voltage can be applied to the second inputs of the first and second switching devices 1132 and 1136. In other words, the second voltage can be a DC voltage.

Figure 16:
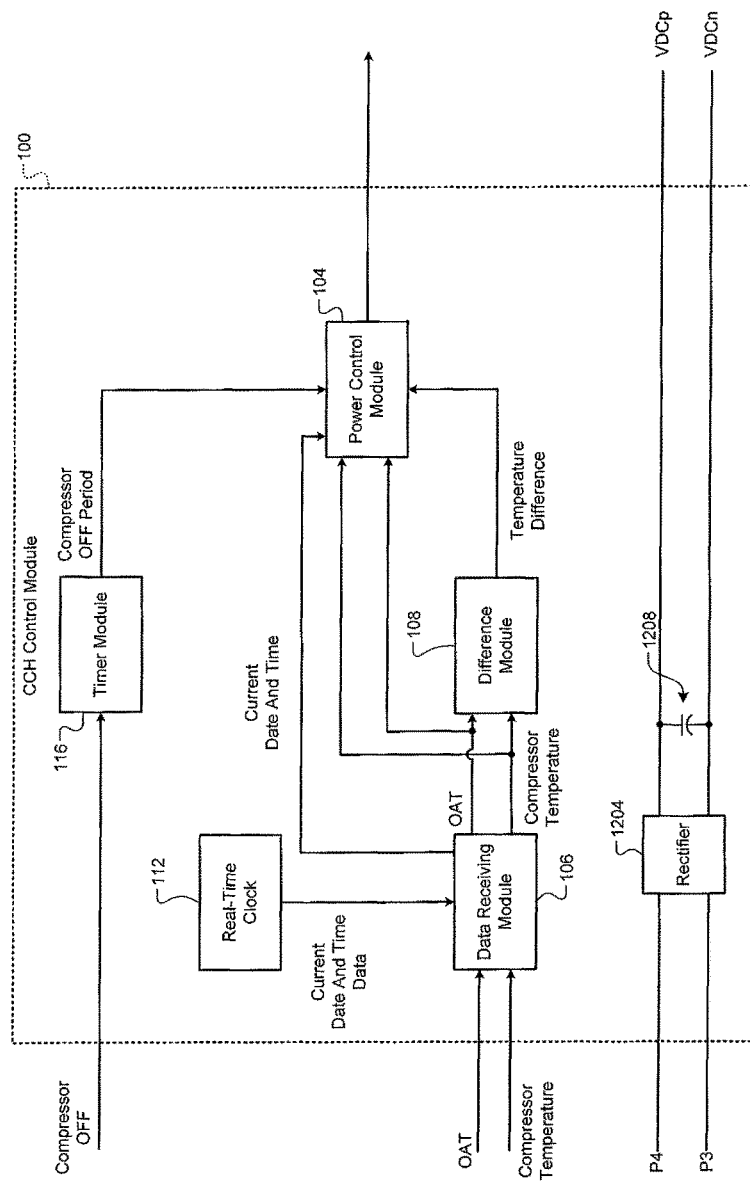
FIG. 16 is another example implementation of the crankcase heating control module according to the present disclosure.

FIG. 16 includes another functional block diagram of the example implementation of the CCH control module 100. Referring now to FIG. 16, the CCH control module 100 may be connected to receive the AC voltage output by the transformer 1144. For example, the CCH control module 100 may receive the AC voltage from the thermostat 1148. In various implementations, the timer module 116 may use the input from the thermostat 1148 to determine whether the compressor 10 is on or off.

The CCH control module 100 may include a rectifier 1204 that converts the received AC voltage into a DC voltage. The CCH control module 100 may also include a capacitor 1208 that smoothes the DC voltage. While only the capacitor 1208 is shown and discussed, more than one capacitor may be used.

In various implementations, the CCH control module 100 may include one or more other components (e.g., an inductor and a switching device) to boost the DC voltage to greater than the peak of the received AC voltage. For example, the CCH control module 100 may boost the DC voltage to approximately 40 Volts DC or another suitable voltage that is less than the first voltage. The CCH control module 100 outputs the DC voltage via first and second DC lines (VDCp and VDCn).

Figure 17A:
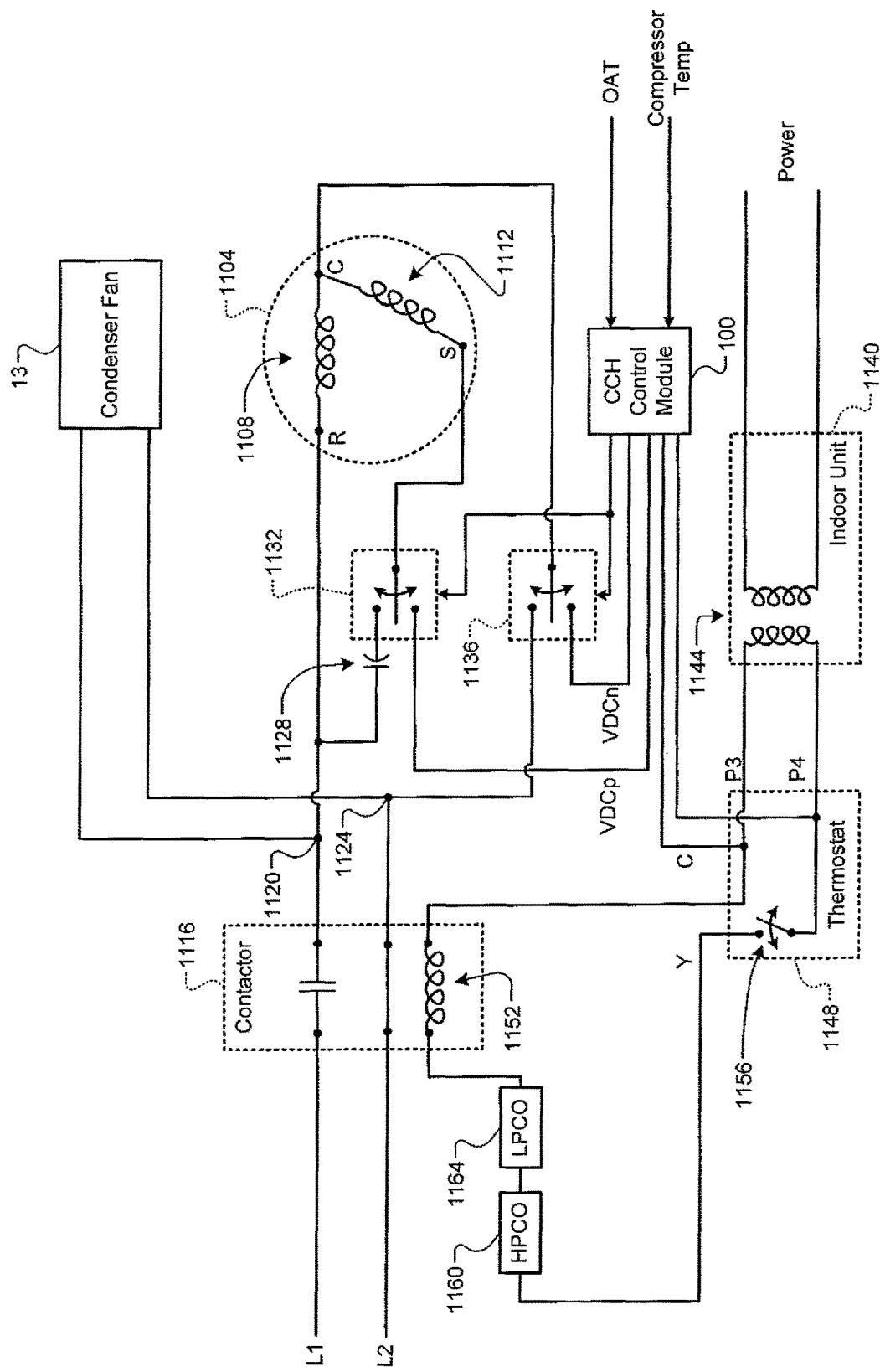
FIGS. 17A, 17B, and 17C are functional block diagrams of example crankcase heating control systems of example single phase heat pump systems according to the present disclosure.
Figure 17B:
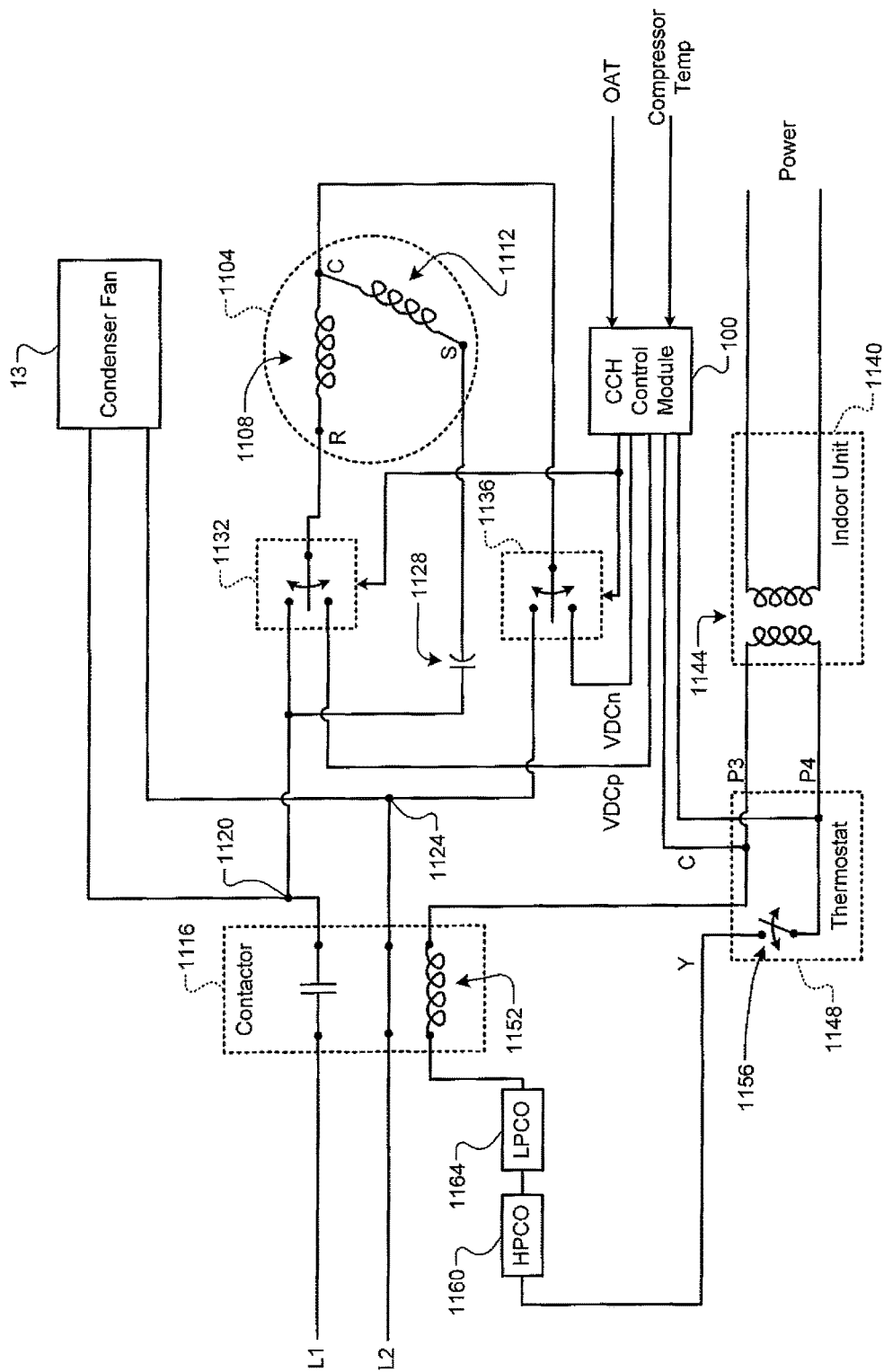
Figure 17C:
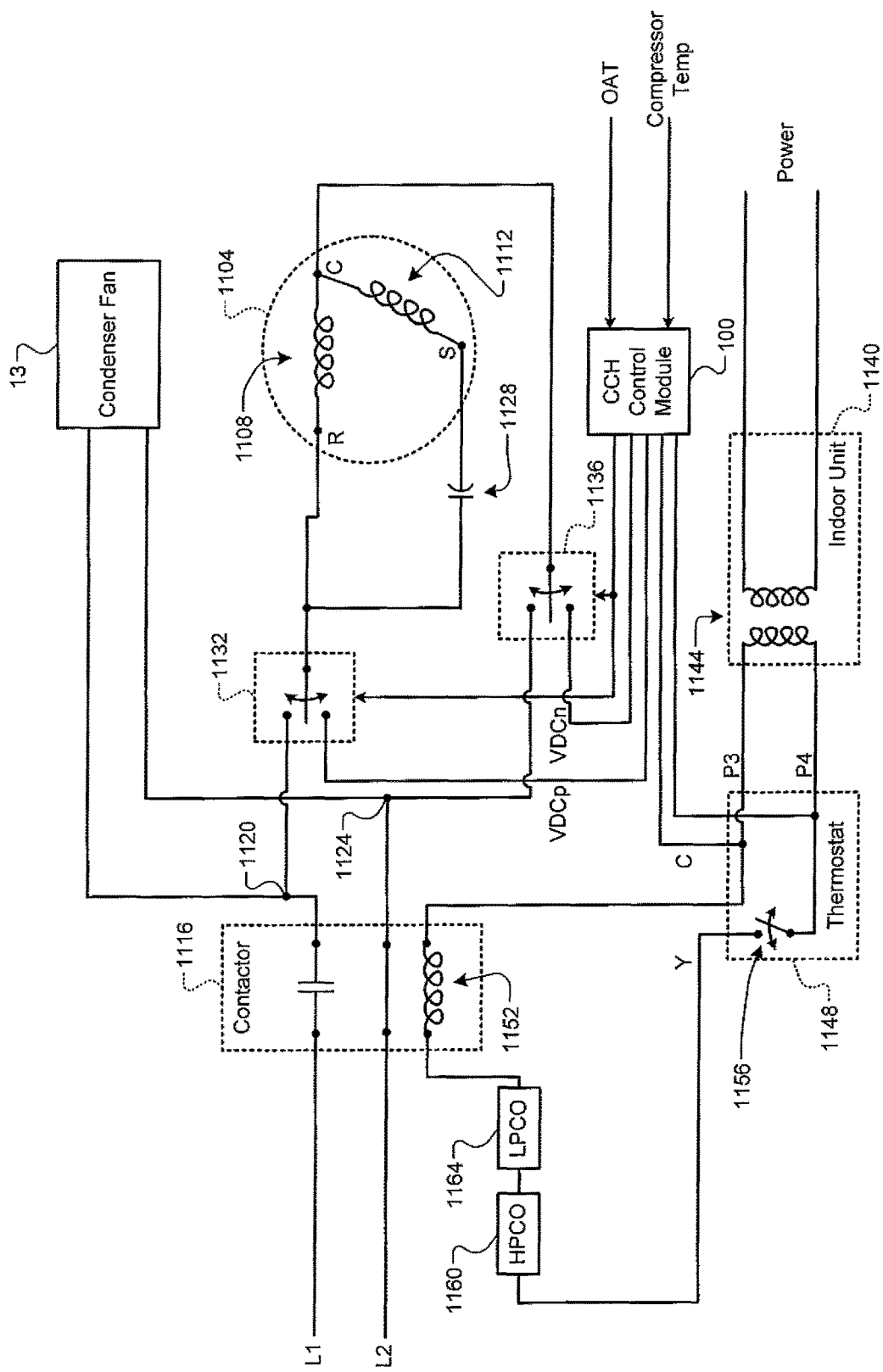

FIGS. 17A, 17B, and 17C include example compressor crankcase heating control systems similar to those of FIGS. 15A, 15B, and 15C, respectively. In FIGS. 17A, 17B, and 17C, the first DC line (VDCp) is connected to the second input of the first switching device 1132, and the second DC line (VDCn) is connected to the second input of the second switching device 1136. In this manner, the DC voltage output by the CCH control module 100 is applied to the first and second switching devices 1132 and 1136 for compressor crankcase heating.

Referring now to FIGS. 15A-C and FIGS. 17A-C, the CCH control module 100 controls the first and second switching devices 1132 and 1136 to control compressor crankcase heating. As discussed above, compressor crankcase heating is performed when the compressor 10 is off (i.e., when the contactor 1116 is open), for example, as described in conjunction with the examples of FIGS. 6-14.

When the contactor 1116 is closed (so the motor of the compressor 10 can drive the crankshaft), the CCH control module 100 controls the first switching device 1132 such that its first input is connected to its output and controls the second switching device 1136 such that its first input is connected to its output. Power from the first and second power lines (L1 and L2) flows through the first and second switching devices 1132 and 1136 and drives the compressor 10.

The thermostat 1148 opens the contactor 1116 to turn the compressor 10 off. When the compressor 10 is turned off, the CCH control module 100 may maintain the first switching device 1132 such that its first input is connected to its output and the second switching device 1136 such that its first input is connected to its output. As the first and second power lines are disconnected from the first and second nodes 1120 and 1124 when the contactor 1116 is open, the compressor 10 is off and no compressor crankcase heating is performed because no power is applied to the run winding 1108 and/or the start winding 1112.

When the contactor 1116 is open (and the compressor 10 is therefore off), the CCH control module 100 performs compressor crankcase heating by controlling the first switching device 1132 such that its second input is connected to its output and controls the second switching device 1136 such that its second input is connected to its output. The second voltage (AC or DC) then flows through the start winding 1112 (e.g., as in FIGS. 15A and 17A), the run winding 1108 (e.g., as in FIGS. 15B and 17B), or both the start winding 1112 and the run winding 1108 (e.g., as in FIGS. 15C and 17C).

The first and second switching devices 1132 and 1136 may be any suitable type of switching devices that remains operable when the contactor 1116 is closed and the compressor 10 is on. In this manner, the first and second switching devices 1132 and 1136 will also remain operable when the contactor 1116 is open and crank case heating is being performed.

For example, when the second voltage is an AC voltage, the first and second switching devices 1132 and 1136 may include relays, triacs, silicon control rectifiers (SCRs), or another suitable type of switching device. If the second voltage is a DC voltage, the first and second switching devices 1132 and 1136 may include metal oxide semiconductor field effect transistors (MOSFETs), insulated gate bipolar transistors (IGBTs), or another suitable type of switching device.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A compressor crankcase heating control method for a heat pump system, the compressor crankcase heating control method comprising:
   selectively actuating a first switching device to connect and disconnect first and second power lines to and from second and third switching devices, respectively,
   the first and second power lines configured to receive a first voltage; and
   when the first and second power lines are disconnected from the second and third switching devices via the first switching device, actuating the second and third switching devices thereby connecting third and fourth power lines to ends, respectively, of at least one winding of a stator of an electric motor of a compressor,
   the at least one winding of the stator of the electric motor configured to heat the crankcase of the compressor, and
   the third and fourth power lines configured to receive a second voltage that is less than the first voltage.

2. The compressor crankcase heating control method of claim 1 wherein the actuating the second and third switching devices includes, when the first and second power lines are disconnected from the second and third switching devices via the first switching device, actuating the second and third switching devices thereby connecting third and fourth power lines to ends, respectively, of at least one winding of the stator of the electric motor of the compressor based on a temperature of the compressor.

3. The compressor crankcase heating control method of claim 1 wherein the actuating the second and third switching devices includes, when the first and second power lines are disconnected from the second and third switching devices via the first switching device, actuating the second and third switching devices thereby connecting third and fourth power lines to ends, respectively, of at least one winding of the stator of the electric motor of the compressor based on an ambient temperature.

4. The compressor crankcase heating control method of claim 1 wherein the actuating the second and third switching devices includes, when the first and second power lines are disconnected from the second and third switching devices via the first switching device, actuating the second and third switching devices thereby connecting third and fourth power lines to ends, respectively, of at least one winding of the stator of the electric motor of the compressor based on a current date.

5. The compressor crankcase heating control method of claim 1 wherein the actuating the second and third switching devices includes, when the first and second power lines are disconnected from the second and third switching devices via the first switching device, actuating the second and third switching devices thereby connecting third and fourth power lines to ends, respectively, of at least one winding of the stator of the electric motor of the compressor based on a current time.

6. The compressor crankcase heating control method of claim 1 wherein the selectively actuating the first switching device includes, by a thermostat, actuating the first switching device based on a temperature within a space and a predetermined temperature.

7. The compressor crankcase heating control method of claim 6 further comprising:
generating, by a transformer of an indoor unit, the second voltage based on a third voltage and outputting the second voltage to the thermostat,
the indoor unit further including an evaporator and a blower; and
by the thermostat, supplying the second voltage to the third and fourth power lines.

8. The compressor crankcase heating control method of claim 7 wherein third voltage is less than the first voltage.

9. The compressor crankcase heating control method of claim 7 wherein third voltage is greater than the first voltage.

10. The compressor crankcase heating control method of claim 7 wherein the second voltage is approximately 24 Volts.

11. The compressor crankcase heating control method of claim 1 further comprising:
generating by a transformer of an indoor unit, a third voltage based on a fourth voltage and outputting the third voltage to a thermostat,
the indoor unit further including an evaporator and a blower;
outputting, by the thermostat, the third voltage to a compressor crankcase heating control module; and
generating, by the crankcase heating control module, the second voltage based on the third voltage and supplying the second voltage to the third and fourth power lines.

12. The compressor crankcase heating control method of claim 11 wherein the third voltage is less than the fourth voltage.

13. The compressor crankcase heating control method of claim 11 wherein the third voltage is greater than the fourth voltage.

14. The compressor crankcase heating control method of claim 1 wherein the at least one winding includes a start winding of the stator.

15. The compressor crankcase heating control method of claim 1 wherein the at least one winding includes a run winding of the stator.

16. A method for a heat pump system, the method comprising:
selectively actuating a first switching device to connect and disconnect first and second inputs of the first switching device to and from first and second nodes, respectively, the first input of the first switching device connected to a first power line, the second input of the first switching device connected to a second power line, the first and second power lines configured to receive a first voltage;
when the first and second inputs are disconnected from the first and second nodes, respectively:
actuating a second switching device to connect a third input of the second switching device to a first output of the second switching device, the third input connected to a third power line, and the first output of the second switching device connected to at least one of a first end of a first winding of a stator of an electric motor of a compressor and a first end of a second winding of the stator; and
actuating a third switching device to connect a fourth input of the third switching device to a second output of the third switching device, the fourth input connected to a third power line, the third power line configured to receive a second voltage that is less than the first voltage, and the second output of the third switching device connected to second ends of the first and second windings; and
when the first and second inputs are connected to the first and second nodes, respectively:
actuating the second switching device to connect a fifth input of the second switching device to the first output of the second switching device, the fifth input connected to the first node; and
actuating the third switching device to connect a sixth input of the third switching device to the second output of the third switching device, the sixth input connected to the second node.

17. The method of claim 16 wherein the actuating the second and third switching devices includes, when the first and second power lines are disconnected from the second and third switching devices via the first switching device, actuating the second and third switching devices based on a temperature of the compressor.

18. The method of claim 16 wherein the actuating the second and third switching devices includes, when the first and second power lines are disconnected from the second and third switching devices via the first switching device, actuating the second and third switching devices based on an ambient temperature.

19. The method of claim 16 wherein the actuating the second and third switching devices includes, when the first and second power lines are disconnected from the second and third switching devices via the first switching device, actuating the second and third switching devices based on at least one of a current date and a current time.

20. The method of claim 16 wherein the selectively actuating the first device includes, by a thermostat, actuating the first switching device based on a temperature within a space and a predetermined temperature.

* * * * *